US012748375B2

(12) United States Patent
Kashiide et al.

(10) Patent No.: US 12,748,375 B2
(45) Date of Patent: Sep. 29, 2026

(54) CARTRIDGE, TONER CARTRIDGE, AND IMAGE FORMING APPARATUS

(71) Applicant: CANON KABUSHIKI KAISHA, Tokyo (JP)

(72) Inventors: Yosuke Kashiide, Tokyo (JP); Yuichi Fukui, Kanagawa (JP); Naoki Hayashi, Kanagawa (JP); Naoki Maeda, Shizuoka (JP); Takashi Kimura, Tokyo (JP); Toshiaki Takeuchi, Shizuoka (JP); Shuichi Gofuku, Shizuoka (JP); Takayuki Yada, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/010,542

(22) Filed: Jan. 6, 2025

(65) Prior Publication Data

US 2025/0138475 A1 May 1, 2025

Related U.S. Application Data

(62) Division of application No. 18/208,405, filed on Jun. 12, 2023, now Pat. No. 12,222,674.

(30) Foreign Application Priority Data

Jun. 24, 2022 (JP) ................................ 2022-101530
Jun. 24, 2022 (JP) ................................ 2022-101531
(Continued)

(51) Int. Cl.
*G03G 21/12* (2006.01)
*G03G 21/16* (2006.01)
*G03G 21/18* (2006.01)

(52) U.S. Cl.
CPC ......... *G03G 21/1885* (2013.01); *G03G 21/12* (2013.01); *G03G 21/1647* (2013.01);
(Continued)

(58) Field of Classification Search
CPC ............... G03G 21/12; G03G 21/1647; G03G 21/1652; G03G 21/1676; G03G 21/1814;
(Continued)

(56) References Cited

U.S. PATENT DOCUMENTS 6,097,906 A 8/2000 Matsuzaki et al.
7,450,877 B2 11/2008 Miyabe et al.
(Continued)

FOREIGN PATENT DOCUMENTS

JP H10-228223 A 8/1998
JP 2003-107872 A 4/2003
(Continued)

OTHER PUBLICATIONS

Jan. 19, 2024 Extended Search Report in European Patent Application Pub. No. 23 179 779.6.
(Continued)

*Primary Examiner* — Sophia S Chen
(74) *Attorney, Agent, or Firm* — Venable LLP

(57) ABSTRACT

A cartridge includes a photosensitive drum rotatable about an axis extending in an axial direction; a memory including a storing element configured to store information, a memory contact electrically connected to the storing element, and a substrate having a surface on which the memory contact is provided; and a frame which supports the photosensitive drum, on which the substrate is mounted, and which includes a first end with respect to the axial direction and a second end opposite from the first end. The frame includes a container provided with an accommodating chamber for accommodating a developer collected from the photosensitive drum and with an opening communicating with the accommodating chamber and includes a mounting member
(Continued)

mounted on the container so as to cover the opening. The mounting member includes a supporting portion for supporting the substrate.

22 Claims, 23 Drawing Sheets

(30) Foreign Application Priority Data

Jun. 24, 2022 (JP) ................................ 2022-101532
Jun. 24, 2022 (JP) ................................ 2022-101533

(52) U.S. Cl.
CPC ..... *G03G 21/1652* (2013.01); *G03G 21/1814* (2013.01); *G03G 21/1867* (2013.01); *G03G 2221/1823* (2013.01)

(58) Field of Classification Search
CPC ........... G03G 21/1867; G03G 21/1885; G03G 2221/1823
See application file for complete search history.

(56) References Cited

U.S. PATENT DOCUMENTS

| | | | | |
|---|---|---|---|---|
| 7,702,251 | B2 | 4/2010 | Miyabe et al. | |
| 7,945,185 | B2 | 5/2011 | Miyabe et al. | |
| 8,155,554 | B2 | 4/2012 | Miyabe et al. | |
| 8,494,399 | B2 | 7/2013 | Miyabe et al. | |
| 2003/0006817 | A1 | 1/2003 | Seo et al. | |
| 2005/0019061 | A1 | 1/2005 | Karakama et al. | |
| 2005/0201773 | A1 | 9/2005 | Matsubara et al. | |
| 2006/0228127 | A1 | 10/2006 | Miyabe et al. | |
| 2008/0159772 | A1 | 7/2008 | Koishi et al. | |
| 2009/0047037 | A1 | 2/2009 | Miyabe et al. | |
| 2010/0158556 | A1 | 6/2010 | Miyabe et al. | |
| 2011/0044717 | A1 | 2/2011 | Miyabe et al. | |
| 2011/0103832 | A1 | 5/2011 | Hayashi et al. | |
| 2011/0206412 | A1 | 8/2011 | Tanabe et al. | |
| 2011/0280620 | A1 | 11/2011 | Chadani et al. | |
| 2012/0177395 | A1 | 7/2012 | Miyabe et al. | |
| 2012/0328324 | A1 | 12/2012 | Chadani et al. | |
| 2013/0022368 | A1 | 1/2013 | Takarada et al. | |
| 2013/0114972 | A1 | 5/2013 | Takarada et al. | |
| 2013/0164029 | A1 | 6/2013 | Fukui et al. | |
| 2013/0177334 | A1 | 7/2013 | Nonaka et al. | |
| 2013/0209137 | A1 | 8/2013 | Hayashi et al. | |
| 2013/0251402 | A1 | 9/2013 | Yamashita et al. | |
| 2013/0272727 | A1 | 10/2013 | Hirukawa et al. | |
| 2013/0308971 | A1 | 11/2013 | Kashiide et al. | |
| 2014/0050503 | A1 | 2/2014 | Chadani et al. | |
| 2014/0056614 | A1 | 2/2014 | Koishi et al. | |
| 2014/0064776 | A1 | 3/2014 | Yamasaki et al. | |
| 2014/0064784 | A1 | 3/2014 | Hayashi et al. | |
| 2014/0072327 | A1 | 3/2014 | Hayashi et al. | |
| 2014/0086620 | A1 | 3/2014 | Takeuchi et al. | |
| 2014/0086621 | A1 | 3/2014 | Makiguchi et al. | |
| 2014/0093272 | A1 | 4/2014 | Matsumaru et al. | |
| 2014/0126928 | A1 | 5/2014 | Batori et al. | |
| 2014/0212166 | A1 | 7/2014 | Takeuchi et al. | |
| 2014/0212181 | A1 | 7/2014 | Nakamura et al. | |
| 2014/0334844 | A1 | 11/2014 | Fukui et al. | |
| 2014/0348535 | A1 | 11/2014 | Murakami et al. | |
| 2014/0361030 | A1 | 12/2014 | Toba et al. | |
| 2014/0376955 | A1 | 12/2014 | Takeuchi et al. | |
| 2015/0003865 | A1 | 1/2015 | Batori et al. | |
| 2015/0037065 | A1 | 2/2015 | Takarada et al. | |
| 2015/0055963 | A1 | 2/2015 | Kanno et al. | |
| 2015/0153706 | A1 | 6/2015 | Tani et al. | |
| 2015/0205226 | A1 | 7/2015 | Komatsu et al. | |
| 2015/0220020 | A1 | 8/2015 | Hayashi et al. | |
| 2015/0227085 | A1 | 8/2015 | Kashiide et al. | |
| 2015/0277367 | A1 | 10/2015 | Maeshima et al. | |
| 2015/0355576 | A1 | 12/2015 | Yamasaki et al. | |
| 2015/0362869 | A1 | 12/2015 | Maeda et al. | |
| 2016/0062270 | A1 | 3/2016 | Fukasawa et al. | |
| 2016/0070207 | A1 | 3/2016 | Yada et al. | |
| 2016/0170369 | A1 | 6/2016 | Toba et al. | |
| 2016/0238967 | A1 | 8/2016 | Fukui et al. | |
| 2016/0238993 | A1 | 8/2016 | Kanno et al. | |
| 2016/0257041 | A1 | 9/2016 | Takarada et al. | |
| 2016/0327887 | A1 | 11/2016 | Takeuchi et al. | |
| 2017/0060033 | A1 | 3/2017 | Takeuchi et al. | |
| 2017/0068210 | A1 | 3/2017 | Maeshima et al. | |
| 2017/0139372 | A1 | 5/2017 | Kashiide et al. | |
| 2017/0168422 | A1 | 6/2017 | Takeuchi et al. | |
| 2017/0242396 | A1 | 8/2017 | Maeshima et al. | |
| 2017/0329279 | A1 | 11/2017 | Hirayama et al. | |
| 2017/0357180 | A1 | 12/2017 | Sue | |
| 2017/0363989 | A1 | 12/2017 | Fukasawa et al. | |
| 2018/0039226 | A1 | 2/2018 | Takeuchi et al. | |
| 2018/0239302 | A1 | 8/2018 | Maeshima et al. | |
| 2018/0348700 | A1 | 12/2018 | Hirayama et al. | |
| 2019/0179256 | A1 | 6/2019 | Hirayama et al. | |
| 2019/0204779 | A1 | 7/2019 | Takeuchi et al. | |
| 2019/0219947 | A1 | 7/2019 | Kimura et al. | |
| 2019/0219948 | A1 | 7/2019 | Kimura et al. | |
| 2019/0286049 | A1 | 9/2019 | Kashiide et al. | |
| 2019/0286051 | A1 | 9/2019 | Sugimoto et al. | |
| 2019/0391529 | A1* | 12/2019 | Abe .................. | G03G 21/1867 |
| 2020/0050143 | A1 | 2/2020 | Hirayama et al. | |
| 2020/0073286 | A1 | 3/2020 | Takeuchi et al. | |
| 2020/0073287 | A1 | 3/2020 | Akiba et al. | |
| 2020/0096937 | A1 | 3/2020 | Maeshima et al. | |
| 2020/0117136 | A1 | 4/2020 | Nishida et al. | |
| 2020/0150582 | A1 | 5/2020 | Hirayama et al. | |
| 2020/0174422 | A1 | 6/2020 | Takeuchi et al. | |
| 2020/0192244 | A1 | 6/2020 | Kimura et al. | |
| 2020/0201245 | A1 | 6/2020 | Hirayama et al. | |
| 2020/0201246 | A1 | 6/2020 | Hirayama | |
| 2020/0201247 | A1 | 6/2020 | Hirayama et al. | |
| 2020/0201248 | A1 | 6/2020 | Hirayama et al. | |
| 2020/0201249 | A1 | 6/2020 | Hirayama et al. | |
| 2020/0209784 | A1 | 7/2020 | Kimura et al. | |
| 2020/0209803 | A1 | 7/2020 | Kimura et al. | |
| 2020/0241468 | A1 | 7/2020 | Hirayama et al. | |
| 2020/0272087 | A1 | 8/2020 | Sueshige et al. | |
| 2020/0272088 | A1 | 8/2020 | Sueshige et al. | |
| 2020/0285191 | A1 | 9/2020 | Shimizu et al. | |
| 2020/0292986 | A1 | 9/2020 | Kashiide et al. | |
| 2020/0333744 | A1 | 10/2020 | Hirayama et al. | |
| 2020/0401080 | A1 | 12/2020 | Maeda | |
| 2021/0011426 | A1 | 1/2021 | Kashiide et al. | |
| 2021/0011428 | A1 | 1/2021 | Maeshima et al. | |
| 2021/0011429 | A1 | 1/2021 | Maeshima et al. | |
| 2021/0041829 | A1 | 2/2021 | Hirayama et al. | |
| 2021/0072666 | A1 | 3/2021 | Kimura et al. | |
| 2021/0109479 | A1 | 4/2021 | Kubo et al. | |
| 2021/0200143 | A1 | 7/2021 | Kashiide et al. | |
| 2021/0200147 | A1 | 7/2021 | Komatsu et al. | |
| 2021/0208523 | A1 | 7/2021 | Kimura et al. | |
| 2021/0216034 | A1 | 7/2021 | Sueshige et al. | |
| 2021/0232085 | A1 | 7/2021 | Kashiide et al. | |
| 2021/0271203 | A1 | 9/2021 | Kimura et al. | |
| 2021/0397122 | A1 | 12/2021 | Fukui et al. | |
| 2022/0035302 | A1 | 2/2022 | Kashiide et al. | |
| 2022/0050417 | A1 | 2/2022 | Nishida et al. | |
| 2022/0066353 | A1 | 3/2022 | Fukasawa et al. | |
| 2022/0066386 | A1 | 3/2022 | Maeshima et al. | |
| 2022/0137551 | A1 | 5/2022 | Kimura et al. | |
| 2022/0236691 | A1 | 7/2022 | Hirayama et al. | |
| 2022/0283535 | A1 | 9/2022 | Sueshige et al. | |
| 2022/0404738 | A1 | 12/2022 | Toba et al. | |
| 2023/0082891 | A1 | 3/2023 | Koishi et al. | |
| 2023/0176496 | A1 | 6/2023 | Fujino et al. | |
| 2023/0176503 | A1 | 6/2023 | Fukui et al. | |
| 2023/0205128 | A1 | 6/2023 | Sugimoto et al. | |
| 2023/0205129 | A1 | 6/2023 | Suetsugu et al. | |
| 2023/0221677 | A1 | 7/2023 | Kashiide et al. | |
| 2023/0273570 | A1 | 8/2023 | Maeshima et al. | |
| 2023/0418208 | A1 | 12/2023 | Hayashida et al. | |
| 2023/0418209 | A1 | 12/2023 | Maeda et al. | |

(56) References Cited

U.S. PATENT DOCUMENTS

| | | | | |
|---|---|---|---|---|
| 2023/0418215 | A1 | 12/2023 | Yada et al. | |
| 2023/0418216 | A1 | 12/2023 | Koga et al. | |
| 2023/0418241 | A1 | 12/2023 | Kimura et al. | |
| 2024/0012345 | A1 * | 1/2024 | Minoshima | G03G 21/1676 |
| 2024/0272125 | A1 | 8/2024 | Nara et al. | |

FOREIGN PATENT DOCUMENTS

| | | | |
|---|---|---|---|
| JP | 2005-257814 | A | 9/2005 |
| JP | 2006-293003 | A | 10/2006 |
| JP | 2007-047397 | A | 2/2007 |
| JP | 2008-165023 | A | 7/2008 |
| JP | 2009-204630 | A | 9/2009 |
| JP | 2014-102506 | A | 6/2014 |
| JP | 2017-219725 | A | 12/2017 |
| JP | 2019-128565 | A | 8/2019 |
| JP | 2022-039729 | A | 3/2022 |
| KR | 102344241 | B1 | 12/2021 |

OTHER PUBLICATIONS

Jun. 2, 2026 Office Action in Japanese Patent Application No. 2022-101533 (with English translation).

Jun. 2, 2026 Office Action in Japanese Patent Application No. 2022-101531 (with English translation).

* cited by examiner (a)

(b)

CARTRIDGE, TONER CARTRIDGE, AND IMAGE FORMING APPARATUS

FIELD OF THE INVENTION AND RELATED ART

The present invention relates to cartridge and a toner cartridge which are for use with an electrophotographic image forming apparatus (image forming apparatus).

The electrophotographic image forming apparatus is an apparatus for forming an image on a recording medium by using an electrophotographic image forming type. Examples of the image forming apparatus include an electrophotographic copying machine, an electrophotographic copying machine, an electrophotographic printer (LED printer, laser beam printer, or the like), a facsimile machine, a word processor, and so on.

Japanese Laid-Open Patent Application No. 2019-128565 discloses a contact provided with ha memory for storing information.

The present invention further develops the prior art.

SUMMARY OF THE INVENTION

According to an aspect of the present invention, there is provided a cartridge comprising: a photosensitive drum rotatable about an axis extending in an axial direction; a memory including a storing element configured to store information, a memory contact electrically connected to the storing element, and a substrate having a surface on which the memory contact is provided; and a frame which supports the photosensitive drum, on which the substrate is mounted, and which includes a first end with respect to the axial direction and a second end opposite from the first end, wherein the frame includes a container provided with an accommodating chamber for accommodating a developer collected from the photosensitive drum and with an opening communicating with the accommodating chamber and includes a mounting member mounted on the container so as to cover the opening, and wherein the mounting member includes a supporting portion for supporting the substrate.

According to another aspect of the present invention, there is provided a cartridge comprising: a photosensitive drum rotatable about an axis extending in an axial direction; a memory including a storing element configured to store information, a memory contact electrically connected to the storing element, and a substrate having a surface on which the memory contact is provided, wherein the substrate is provided so that a normal direction to the surface crosses the axial direction; a frame which supports the photosensitive drum, on which the substrate is mounted, and which includes a first end with respect to the axial direction and a second end opposite from the first end, a first projected portion, a second projected portion, a third projected portion, and a fourth projected portion, wherein with respect to the axial direction, a distance between the memory contact and the second end is shorter than a distance between a center of the frame and the memory contact, wherein with respect to the axial direction, the first projected portion is adjacent to the substrate and is provided between the substrate and the second end, the second projected portion is provided between the first projected portion and the second end, the third projected portion is provided between the substrate and the first end, and the fourth projected portion is provided between the third projected portion and the first end, and wherein toward an exposure direction which is parallel to the normal direction and in which the memory contact is exposed, the first projected portion and the third projected portion are projected relative to the surface, the second projected portion is projected relative to the first projected portion, and the fourth projected portion is projected relative to the third projected portion.

According to another aspect of the present invention, there is provided a cartridge comprising: a photosensitive drum rotatable about a first axis extending in a first direction; a rotatable member rotatable about a second axis extending in a second direction crossing the first direction; a memory including a storing element configured to store information, a memory contact electrically connected to the storing element, and a substrate having a surface on which the memory contact is provided; and a frame which supports the photosensitive drum and the rotatable member, on which the substrate is mounted, and which includes a first end with respect to the first direction and a second end opposite from the first end, wherein as viewed in the first direction, the memory contact extends in the second direction and is positioned between the second axis and a rectilinear line passing through a rotation center of the photosensitive drum.

According to a further aspect of the present invention, there is provided a toner cartridge comprising: a first rotatable member rotatable about an axis extending in an axial direction; a frame provided with a first chamber for accommodating toner, a second chamber, a first opening, and a second opening, wherein (i) the frame includes a wall for partitioning between the first chamber and the second chamber so as to prevent the toner from moving between the first chamber and the second chamber, (ii) the frame includes a first end with respect to the axial direction and a second end opposite from the first end with respect to the axial direction, and (iii) the first chamber accommodates the first rotatable member, the first opening permits communication between an outside of the frame and the first chamber, and the second opening permits communication between the outside of the frame and the second chamber; and a memory including a storing element configured to store information and a memory contact electrically connected to the storing element, wherein with respect to the axial direction, a distance between the memory contact and the first end is shorter than a distance between the memory contact and the second end, and a distance between the second opening and the second end is shorter than a distance between the second opening and the first end.

Further features of the present invention will become apparent from the following description of exemplary embodiments with reference to the attached drawings.

Figure 10:
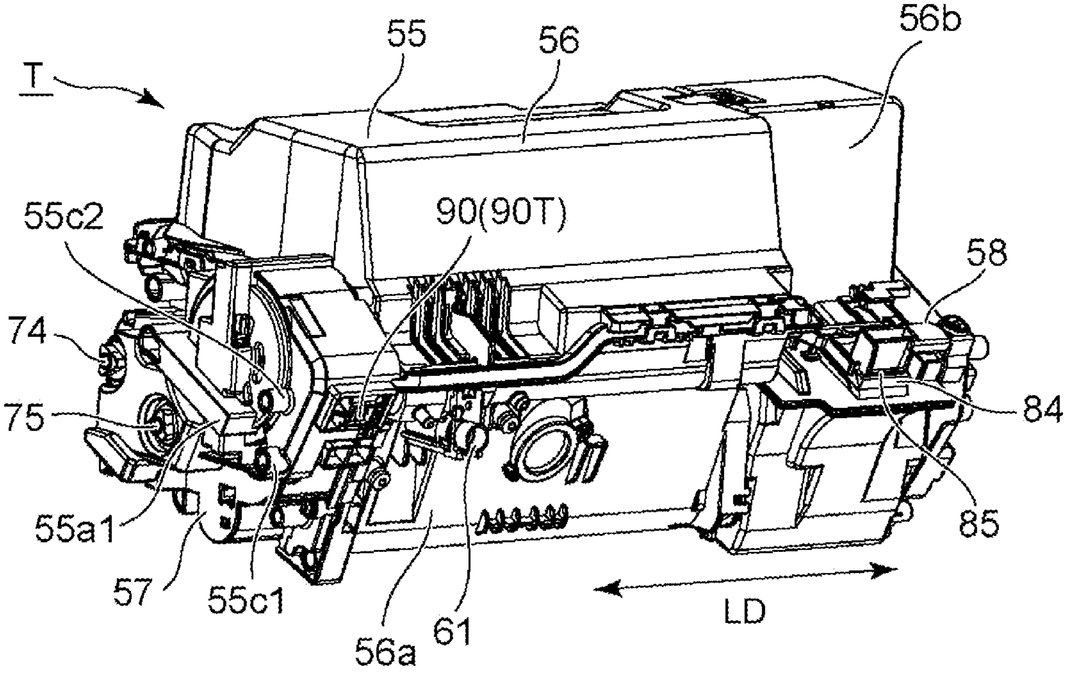
Figure 10:
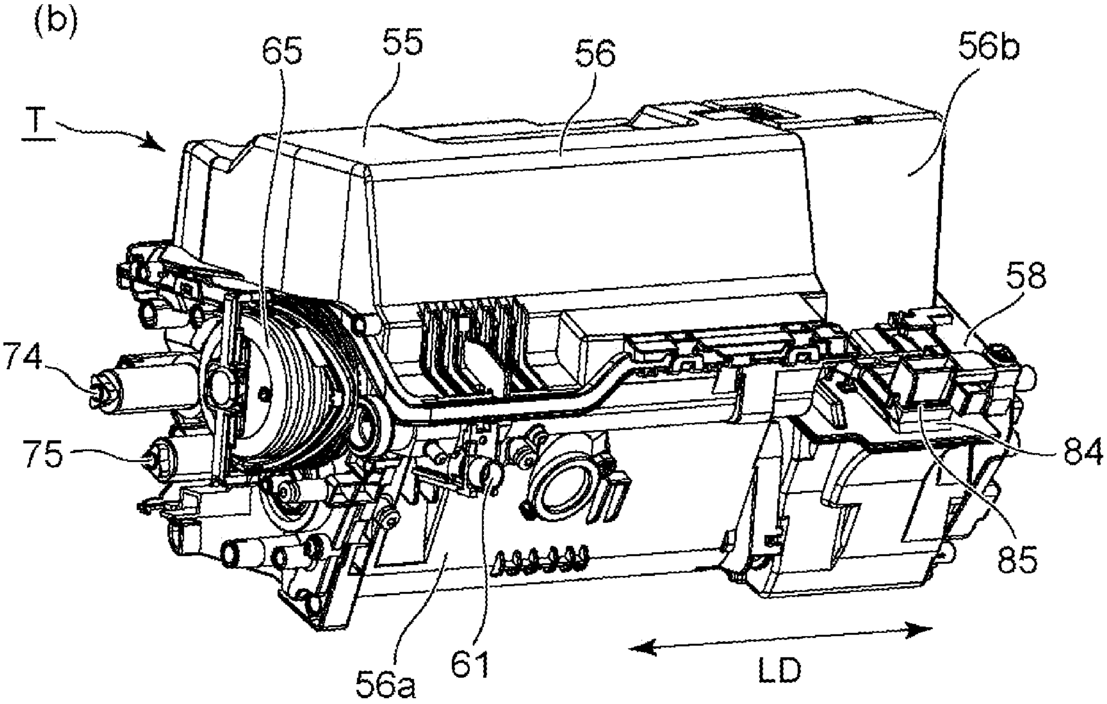

Parts (a) and (b) of FIG. 10 are perspective views of the toner cartridge.

Figure 11:
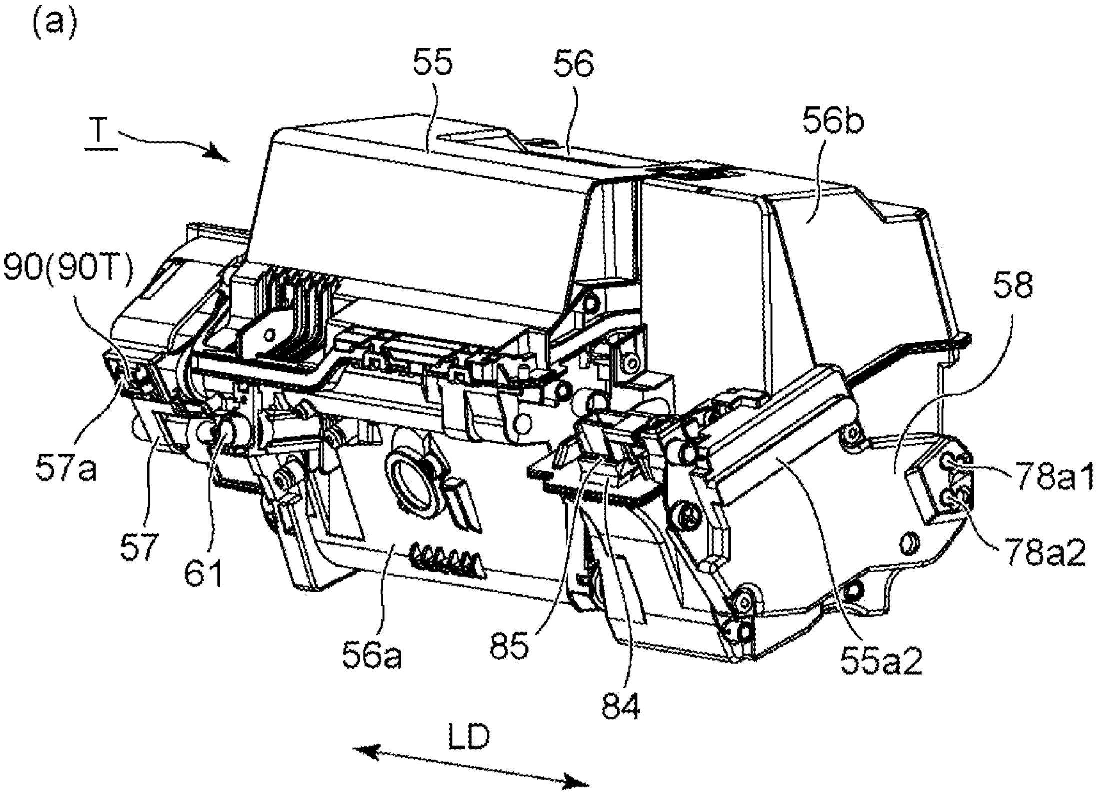
Figure 11:
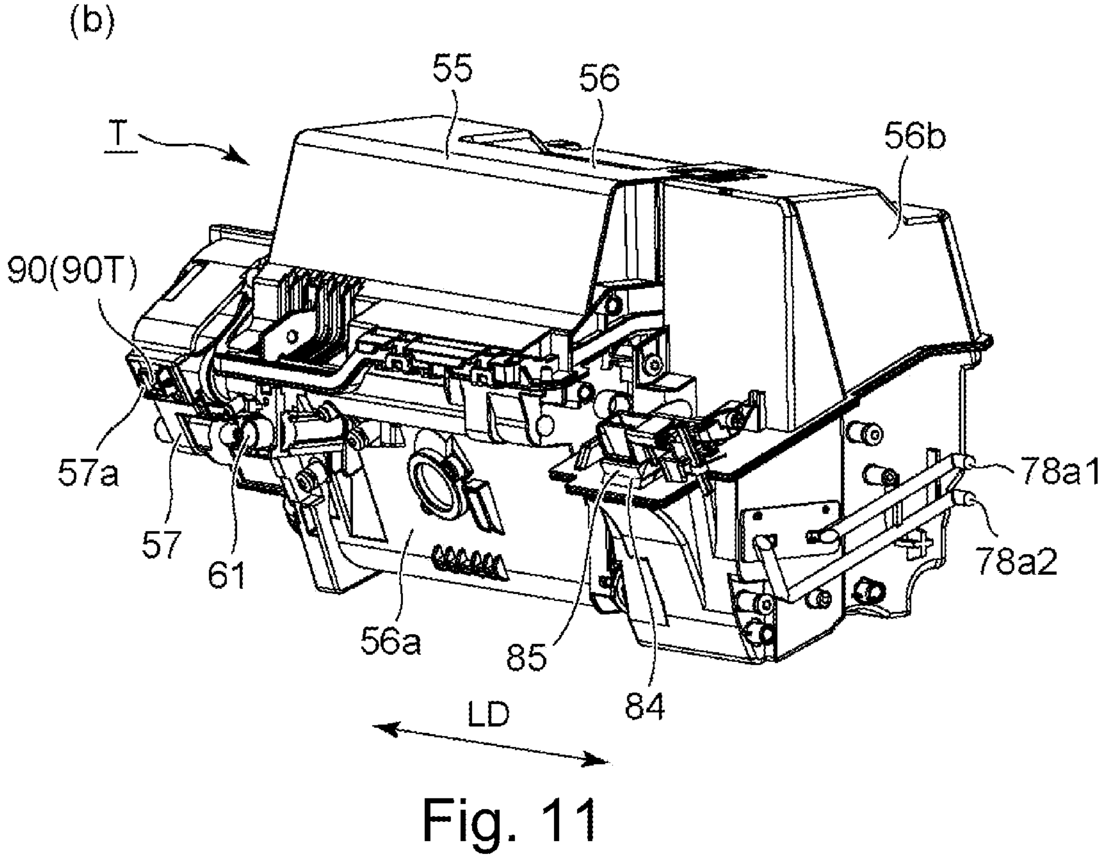

Parts (a) and (b) of FIG. 11 are perspective views of the toner cartridge.

Figure 12:
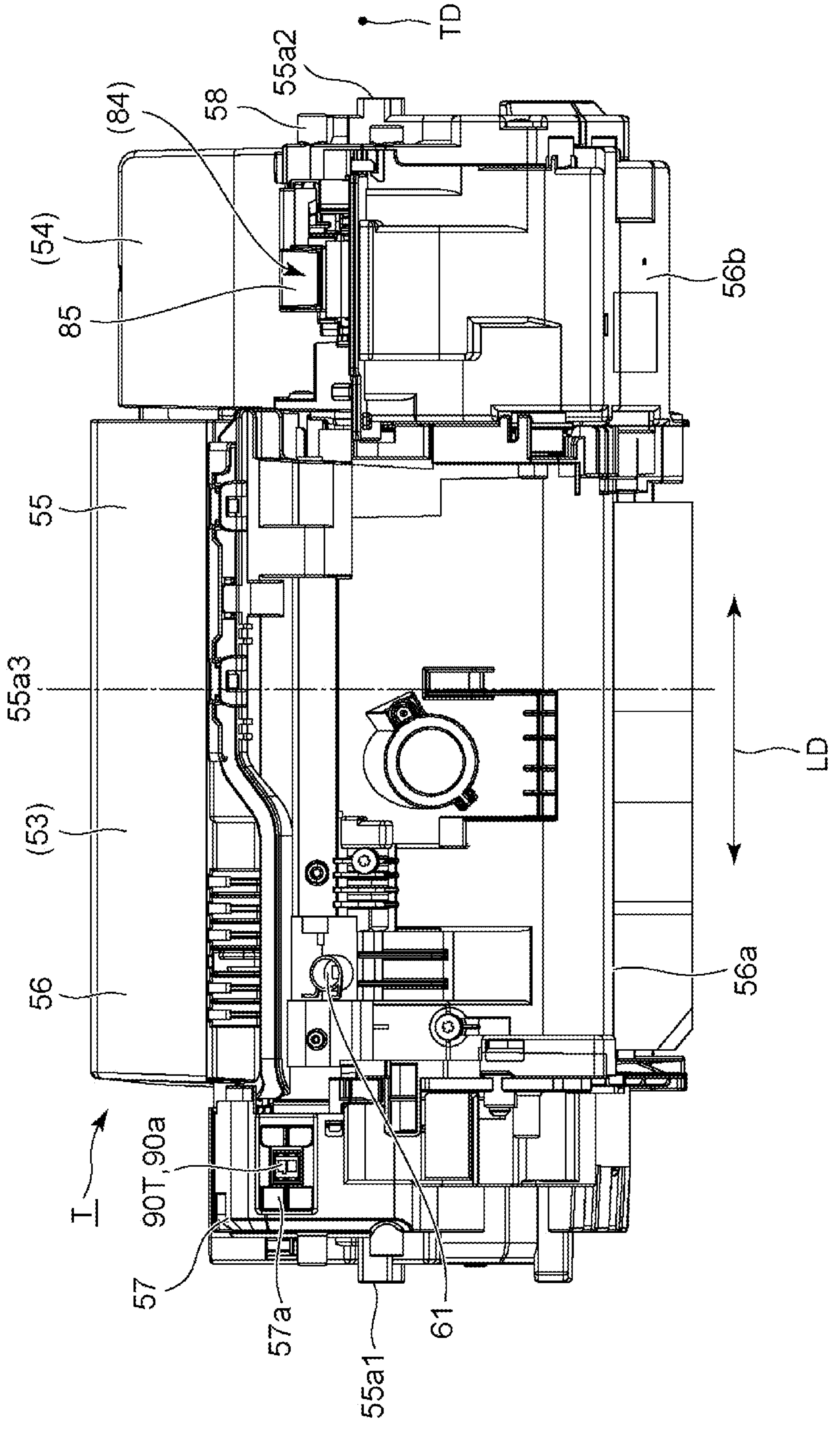

FIG. 12 is a schematic view of the toner cartridge as viewed in the demounting direction.

Figure 13:
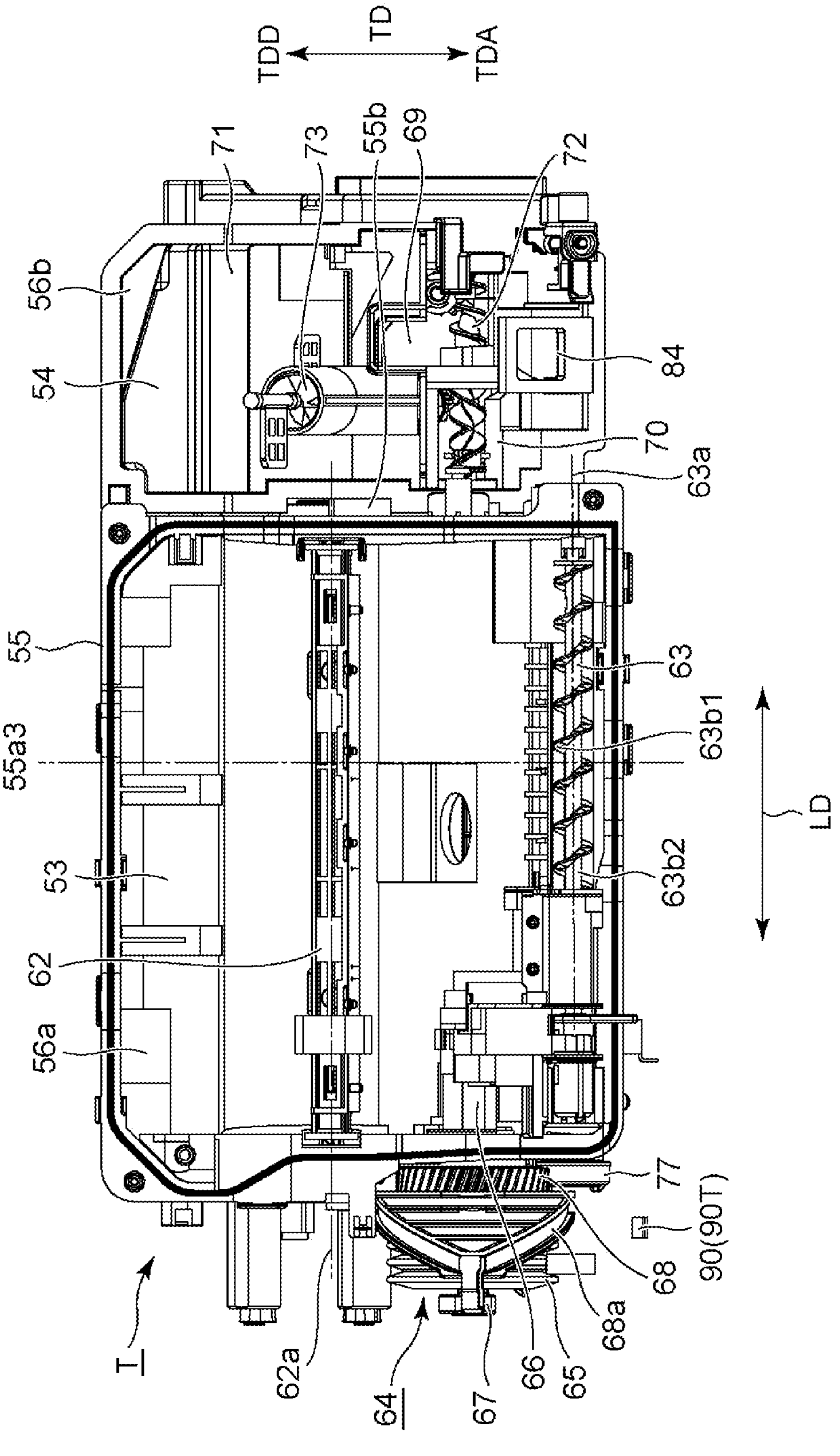

FIG. 13 is a schematic view showing an inside structure of the toner cartridge.

Figure 14:
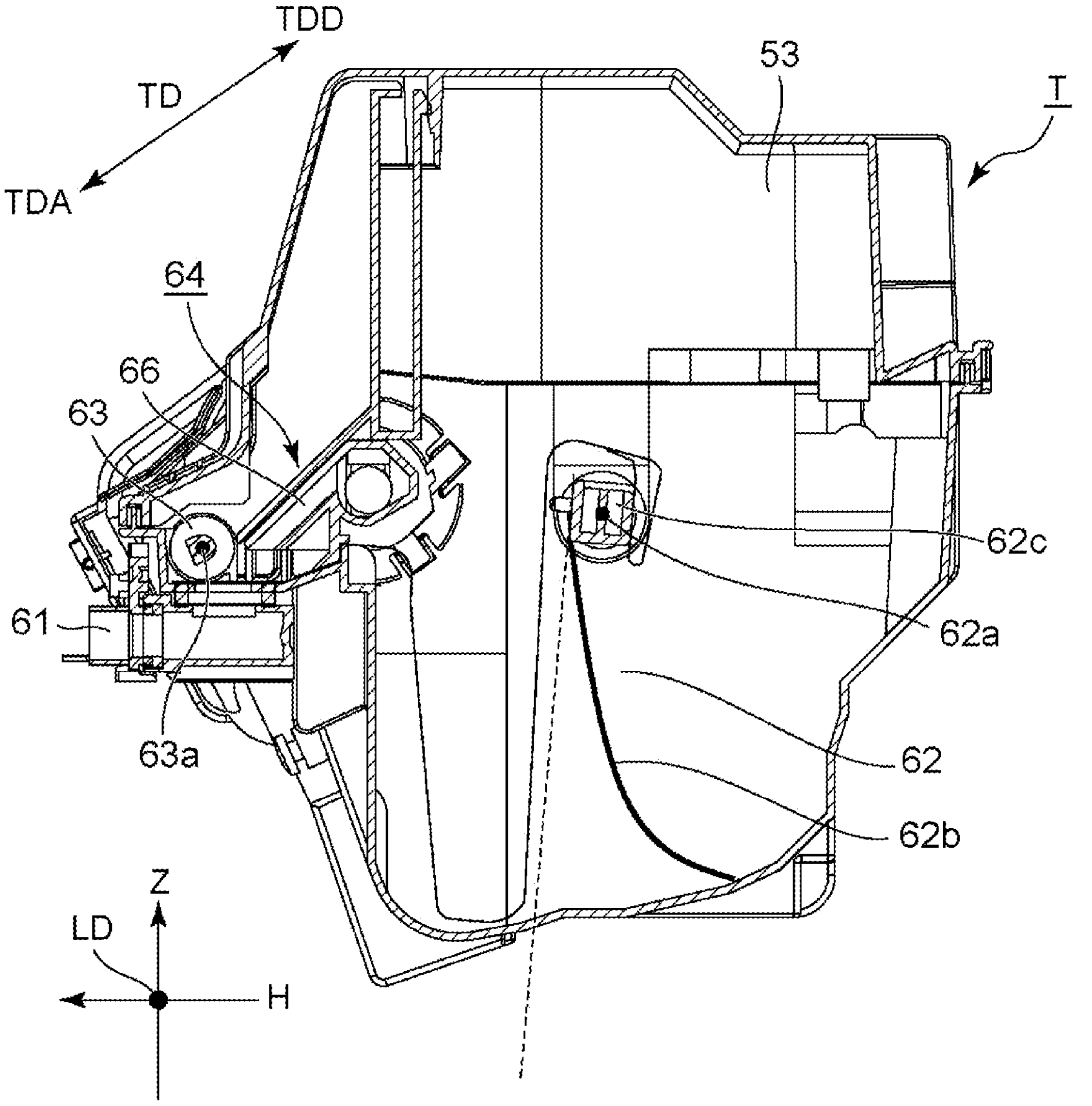

FIG. 14 is a sectional view of the toner cartridge.

Figure 15:
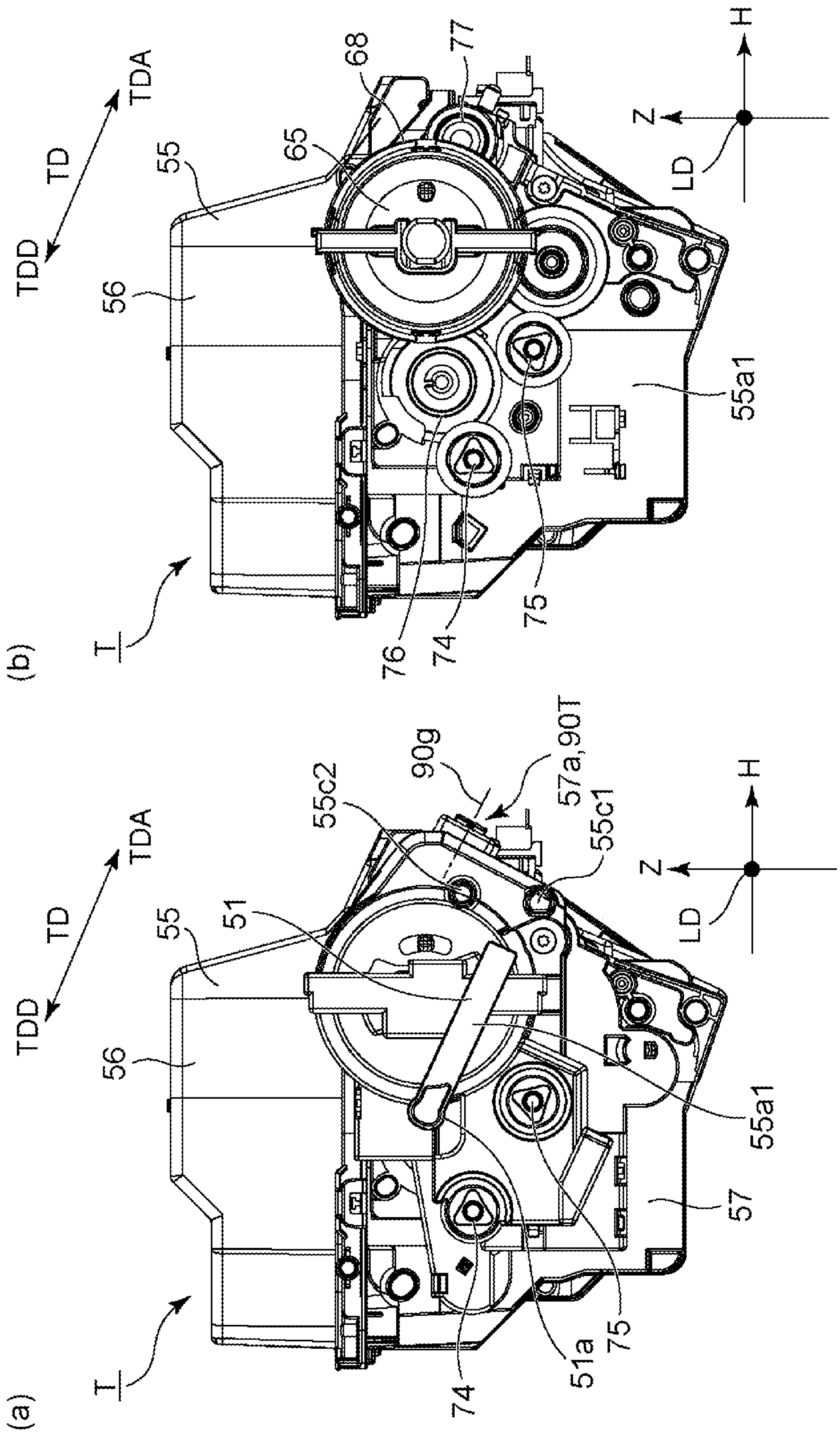

Parts (a) and (b) of FIG. 15 are side views of the toner cartridge.

Figure 16:
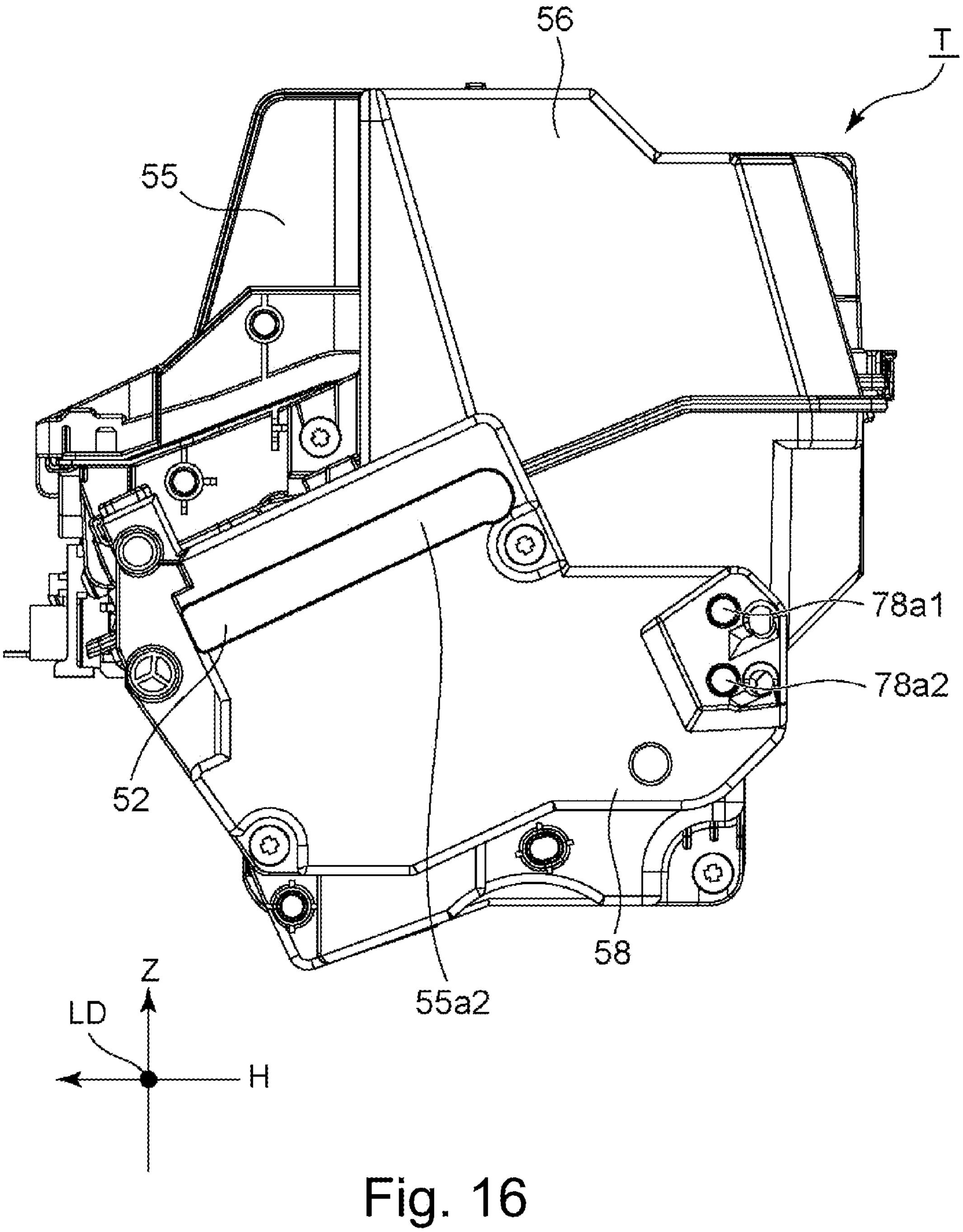

FIG. 16 is a side view of the toner cartridge.

Figure 17:
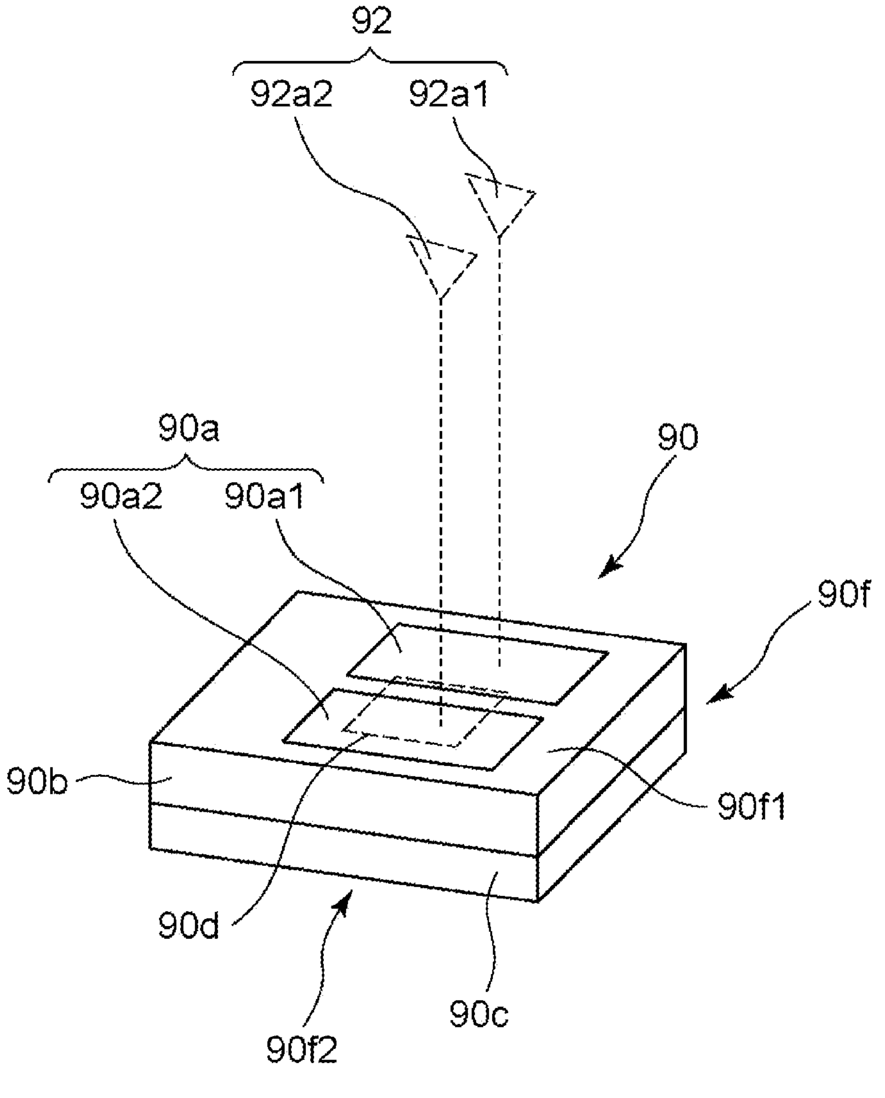

FIG. 17 is an illustration of a memory tag.

Figure 18:
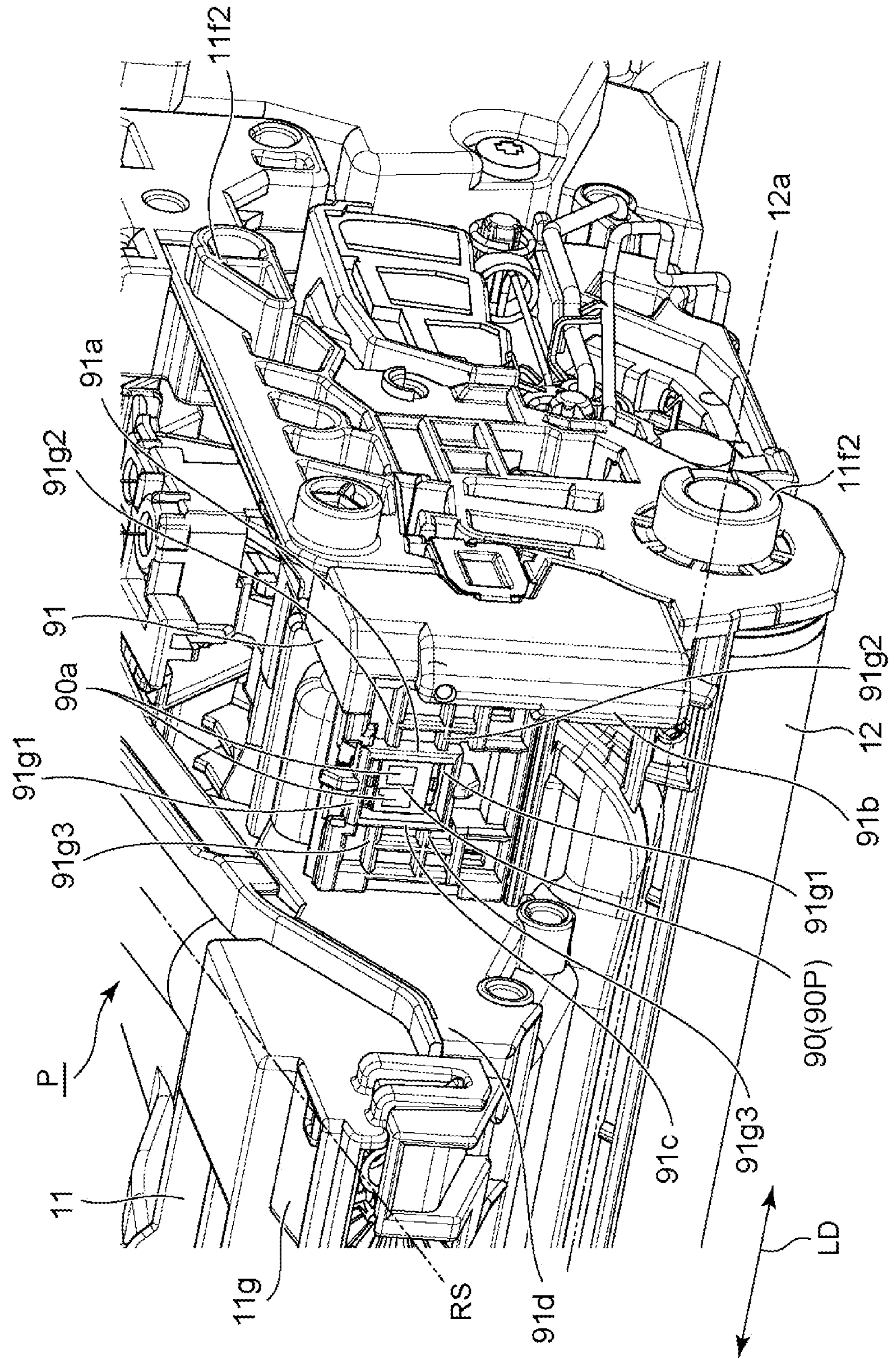

FIG. 18 is a perspective view showing an arrangement of the memory tag of the process cartridge.

Figure 19:
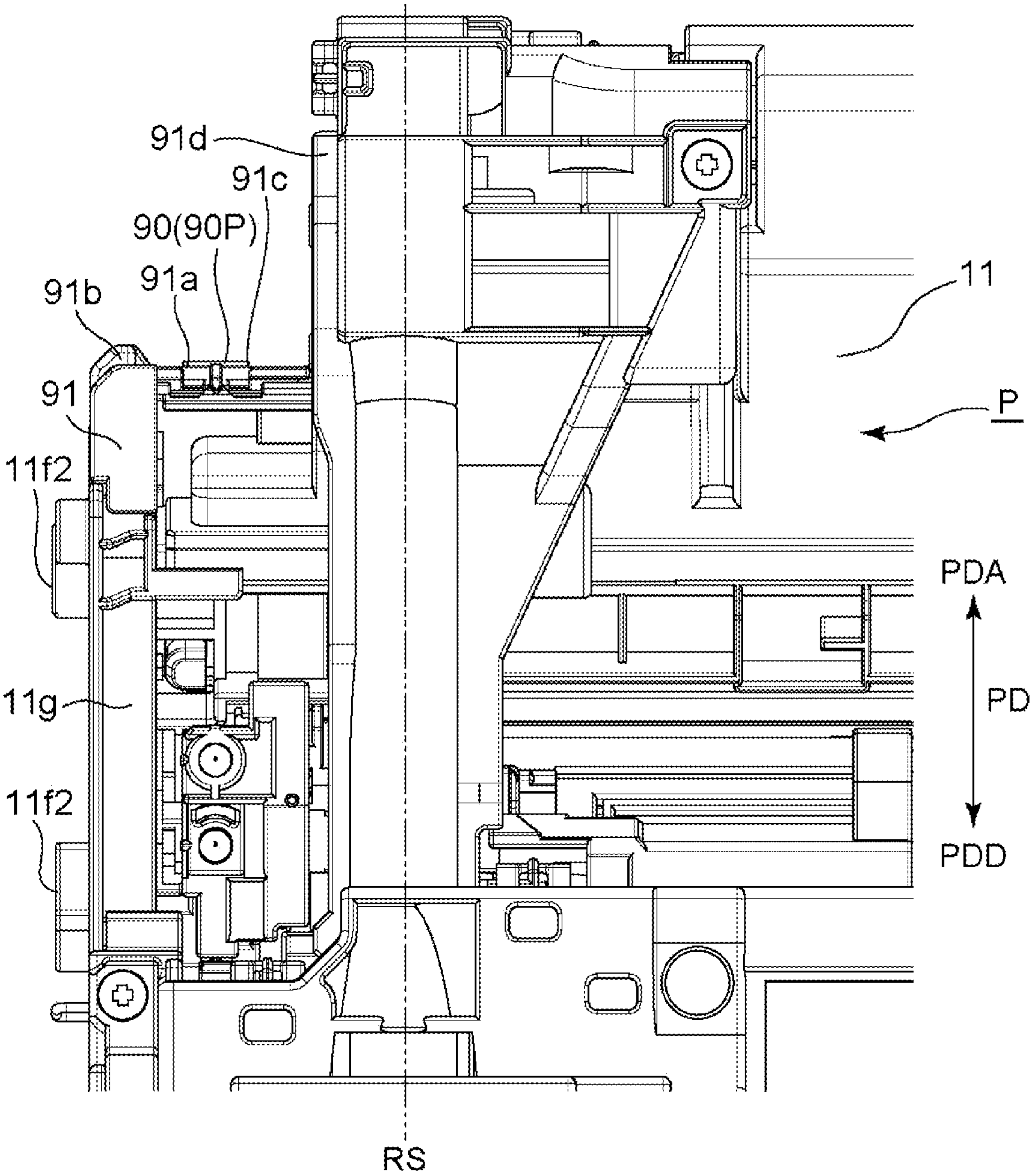

FIG. 19 is a top (plan) view showing the arrangement of the memory tag of the process cartridge.

Figure 20:
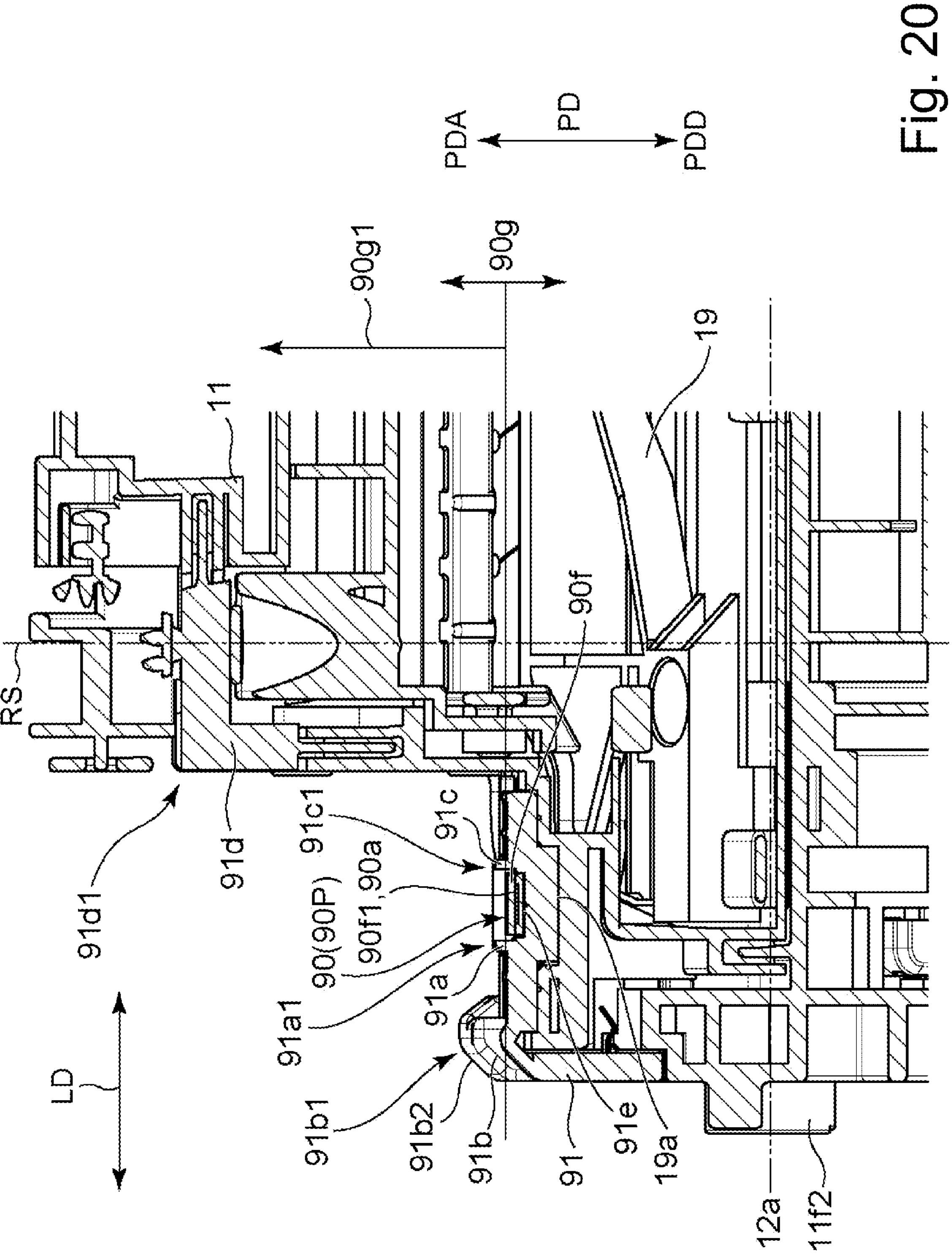

FIG. 20 is a sectional view showing the arrangement of the memory tag of the process cartridge.

Figure 21:
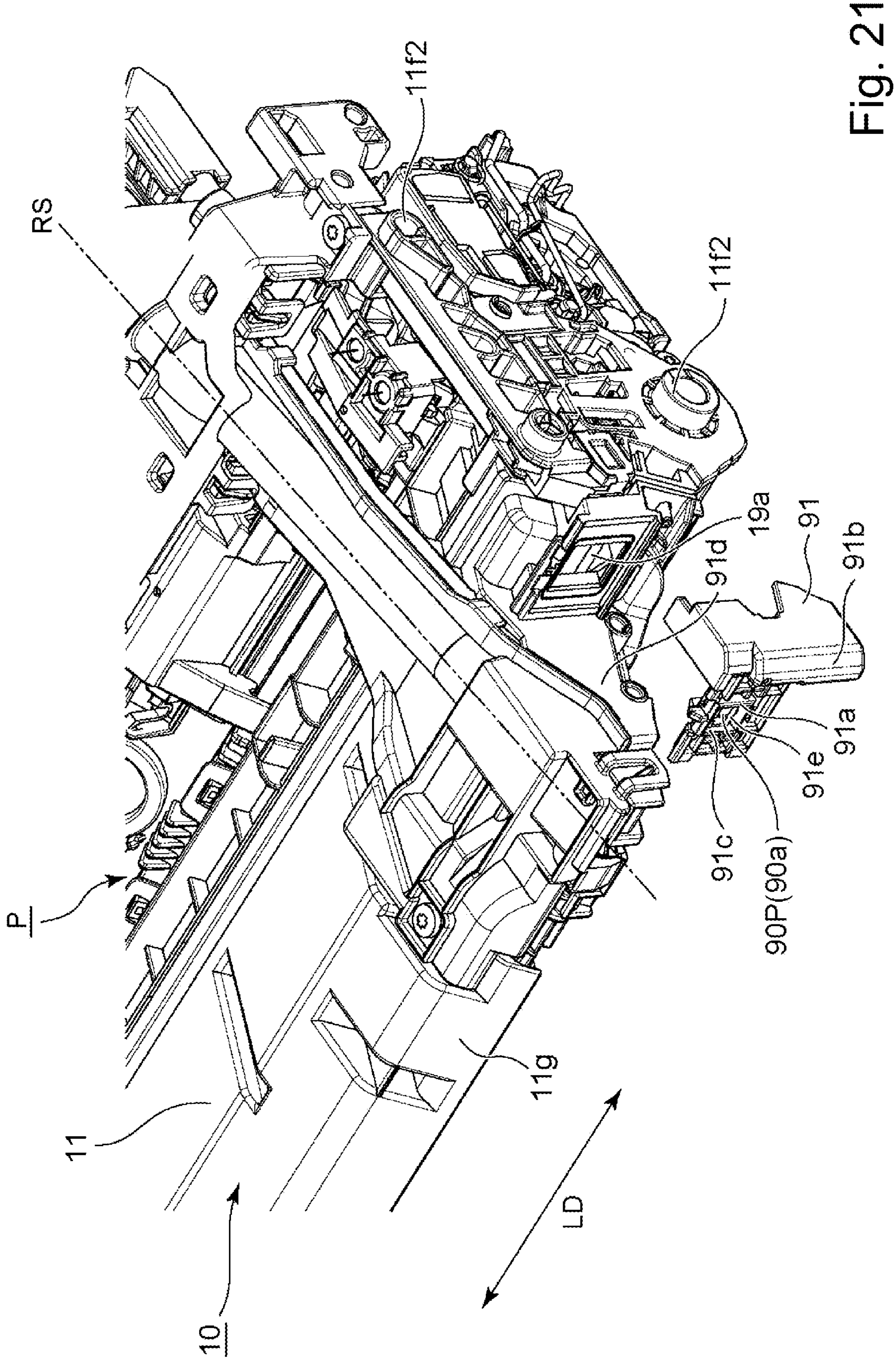

FIG. 21 is a perspective view for illustrating a mounting member.

Figure 22:
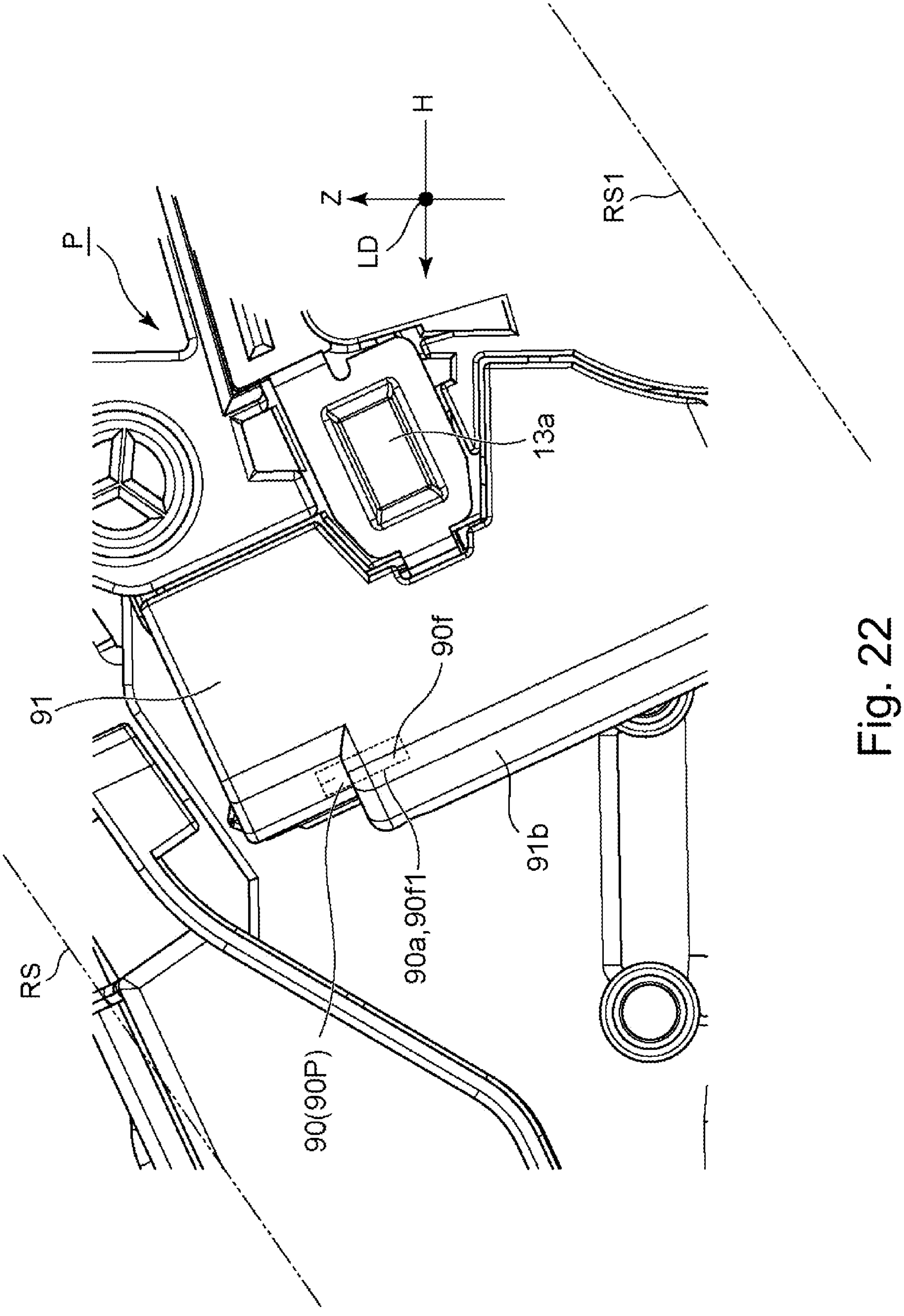

FIG. 22 is a side view showing the arrangement of the memory tag of the process cartridge.

Figure 23:
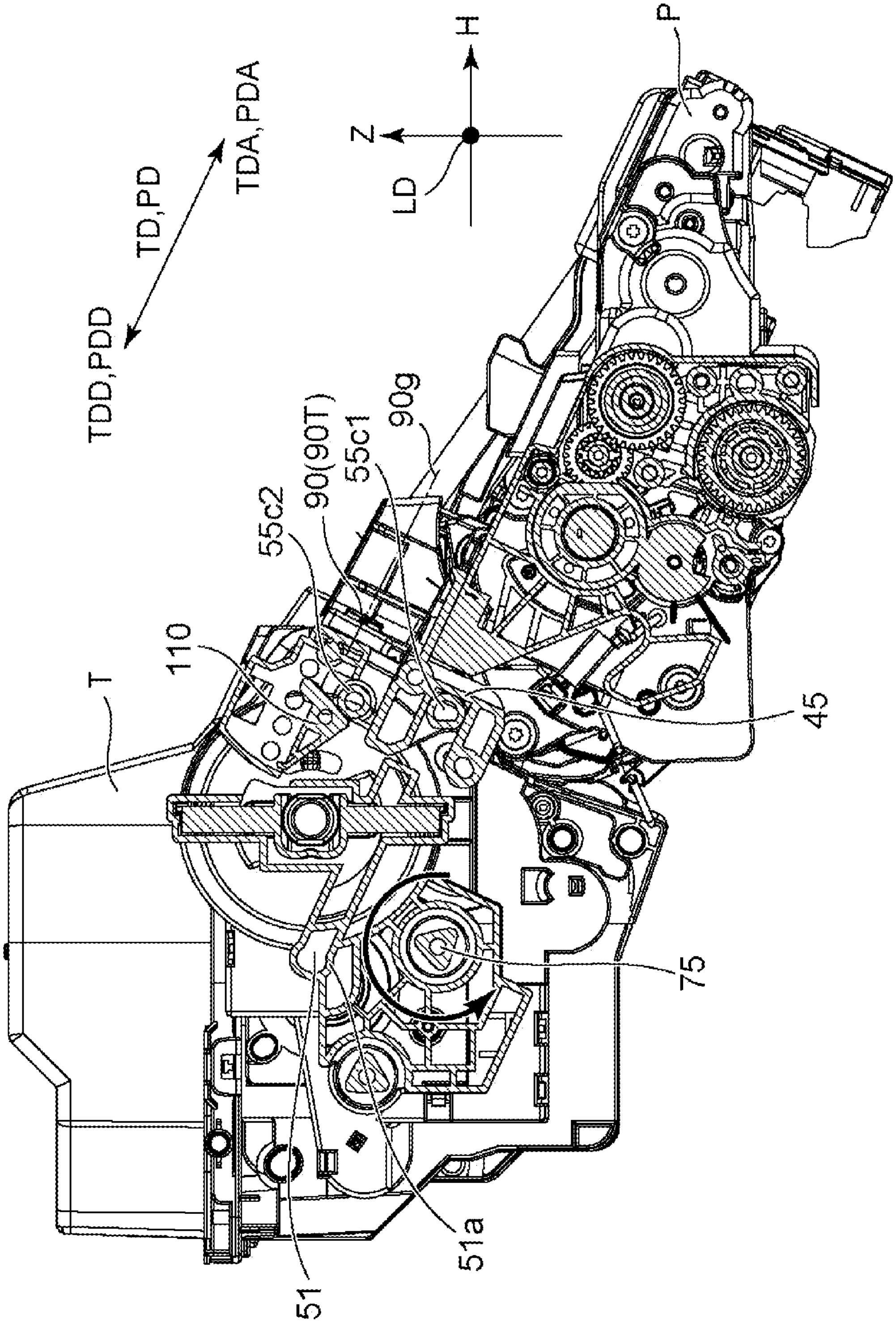

FIG. 23 is a sectional view for illustrating mounting of the toner cartridge to the process cartridge.

DESCRIPTION OF THE EMBODIMENTS

Embodiments of the present invention will be specifically described with reference to the drawings. However, dimensions, materials, shapes and relative arrangements of constituent elements described in the following embodiments should appropriately be changed depending on structures and various conditions of apparatuses to which the present invention is applied. Accordingly, the scope of the present invention is not intended to be limited to the following embodiments unless otherwise specified.

Embodiment 1

<General Outline of Printer>

Figure 1:
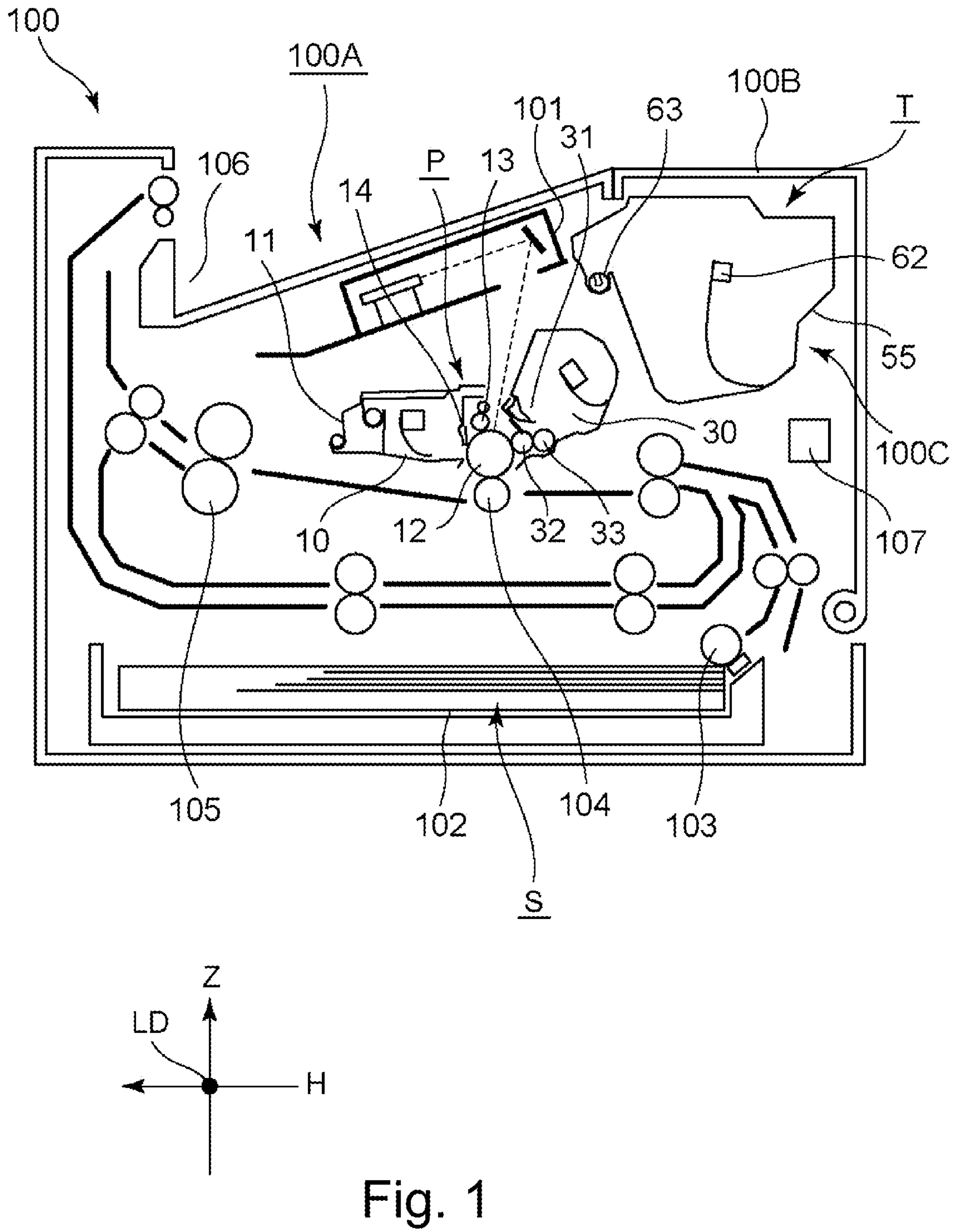
FIG. 1 is a schematic sectional view showing a structure of a printer.

A basic structure of a printer 100 as an image forming apparatus according to an embodiment 1 and an operation of the printer 100 will be described using FIG. 1. FIG. 1 is a schematic sectional view showing a structure of the printer 100 according to this embodiment. An arrow Z represents a vertical direction, and an arrow H represents a horizontal direction.

As shown in FIG. 1, the printer 100 includes an apparatus main assembly 100A, and a process cartridge P and a toner cartridge T which are as cartridges detachably mountable to the apparatus main assembly 100A.

The apparatus main assembly 100A includes a scanner 101 as an exposure device, a stacking tray 102 on which sheets S are stacked, a sheet (paper) feeding roller 103, a transfer roller 104, a fixing portion 105, a discharge tray 106, and a controller 107. Further, the process cartridge P and the toner cartridge (developer cartridge) T are detachably mounted into the apparatus main assembly 100A.

The process cartridge P includes a photosensitive drum 12, a cleaning blade (cleaning member) 14, a charging roller (charging member) 13, a drum unit including a drum frame 11, and a developing unit 30 including a developing roller 32 and a developing frame 31. The photosensitive drum 12 is rotatably supported by the drum frame 11. The developing roller 32 is rotatably supported by the developing frame 31.

The toner cartridge T is mountable to the process cartridge P. The toner cartridge T accommodates toner as a developer and is constituted so as to supply the toner to the developing unit 30 of the process cartridge P. The toner cartridge T includes a toner feeding member 62, a toner feeding screw 63, and a toner frame 55. The toner feeding member 62 and the toner feeding screw 63 are rotatably supported by the toner frame 55.

An image forming operation for forming an image on a sheet S will be described. A controller 107 of the printer 100 starts the image forming operation on the basis of a signal received from an external device.

First, the photosensitive drum 12 is rotated by a driving source of the apparatus main assembly 100. In a state in which a charging voltage is applied to the charging roller 13, the charging roller 13 is rotated by the photosensitive drum 12. As a result, a surface of the photosensitive drum 12 is electrically charged uniformly. On the basis of image information, the charged surface of the photosensitive drum 12 is irradiated with laser light by the scanner 101, so that an electrostatic latent image is formed on the surface of the photosensitive drum 12.

The toner is supplied from the developing roller 32 to the photosensitive drum 12, so that the electrostatic latent image is formed as a toner image. The photosensitive drum 12 is rotated, so that the toner image formed on the photosensitive drum 12 is conveyed to a transfer portion formed between the transfer roller 104 and the photosensitive drum 12.

On the other hand, the sheet S is fed from the stacking tray 102 by the feeding roller 103. The sheet S is fed to the transfer portion in synchronism with a timing when the toner image formed on the photosensitive drum 12 reaches the transfer portion.

A transfer view is applied to the transfer roller 104, so that the toner image is transferred from the photosensitive drum 12 onto the sheet S. Transfer residual toner which is not transferred onto the sheet S is removed from the surface of the photosensitive drum 12 by the cleaning blade 14.

The sheet S on which the toner image is transferred is conveyed toward the fixing portion 105. When the sheet S passes through the fixing portion 105, the toner image is heated and pressed by the fixing portion 105, so that the sheet S is fixed on the sheet S.

The printer 100 according to this embodiment is capable of executing double-side printing in which an image forming operation for forming images on a front surface (side) and a back surface (side) of the sheet S. In the case where the image is formed on only the front surface of the sheet S, the sheet S passed through the fixing portion 105 is discharged on the discharge tray 106. On the other hand, in the case where the double-side printing is executed, the sheet S on which the toner image is fixed on the front surface is fed again to the transfer portion through a double-side feeding passage, and then the toner image is formed on the back surface of the sheet S. Thereafter, the sheet S passes through the fixing portion 105 and is discharged on the discharge tray 106.

<Mounting and Demounting of Process Cartridge and Toner Cartridge>

Mounting and demounting of the process cartridge P and the toner cartridge T according to this embodiment will be described using FIGS. 1 to 5.

Figure 2:
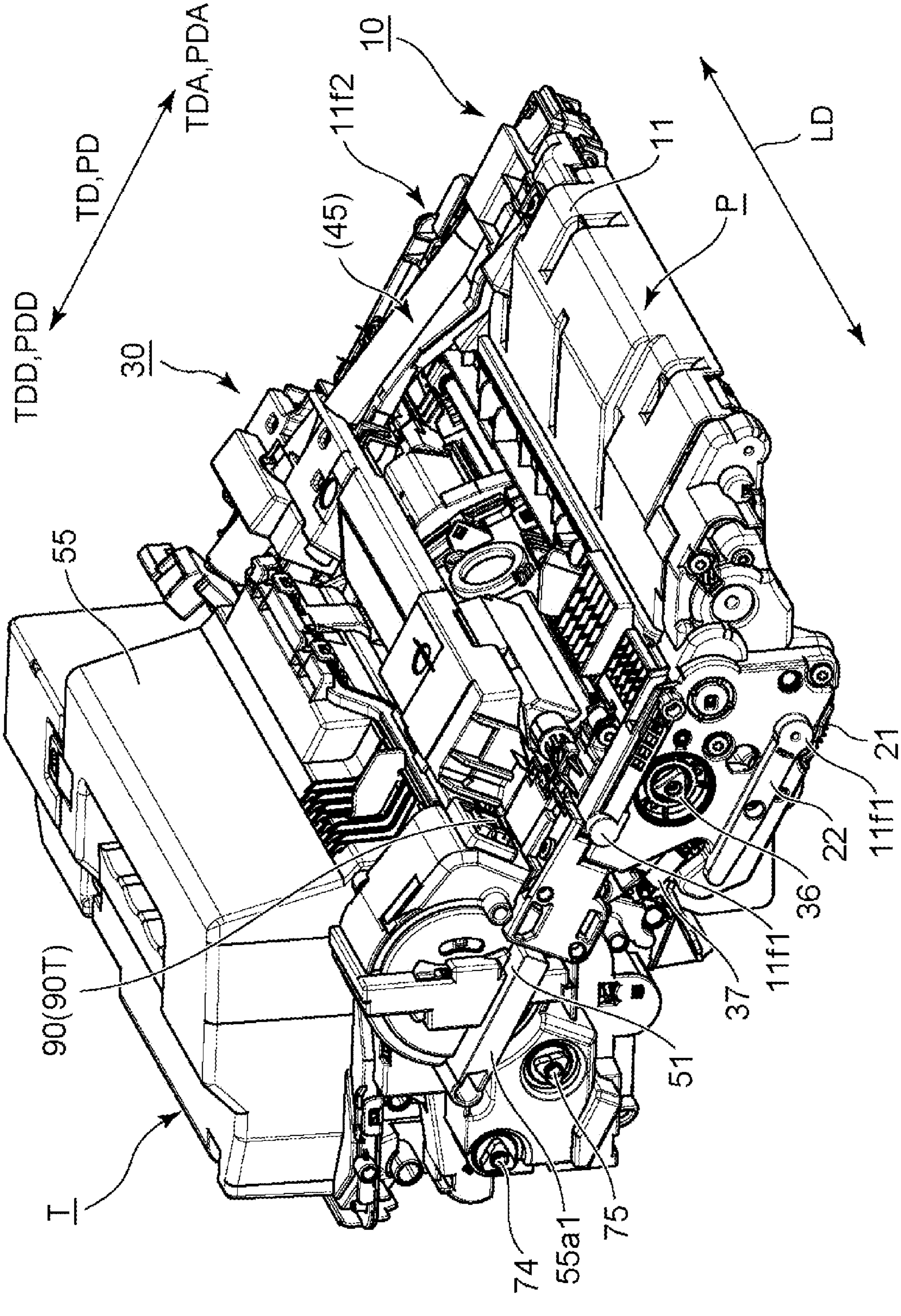
FIG. 2 is a perspective view of a process cartridge and a toner cartridge.
Figure 3:
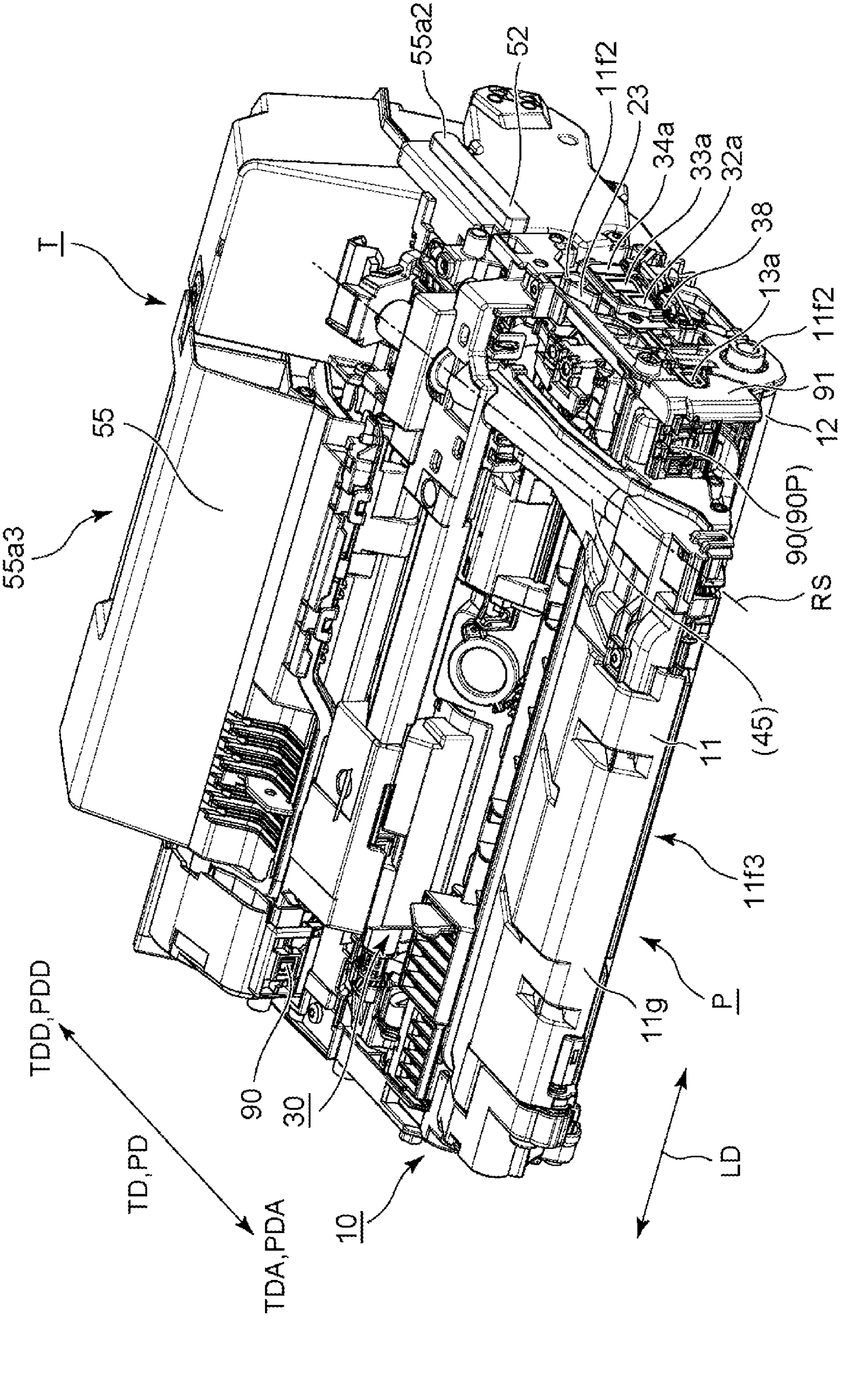
FIG. 3 is a perspective view of the process cartridge and the toner cartridge.

FIGS. 2 and 3 are perspective views of the process cartridge P and the toner cartridge T.

Figure 5:
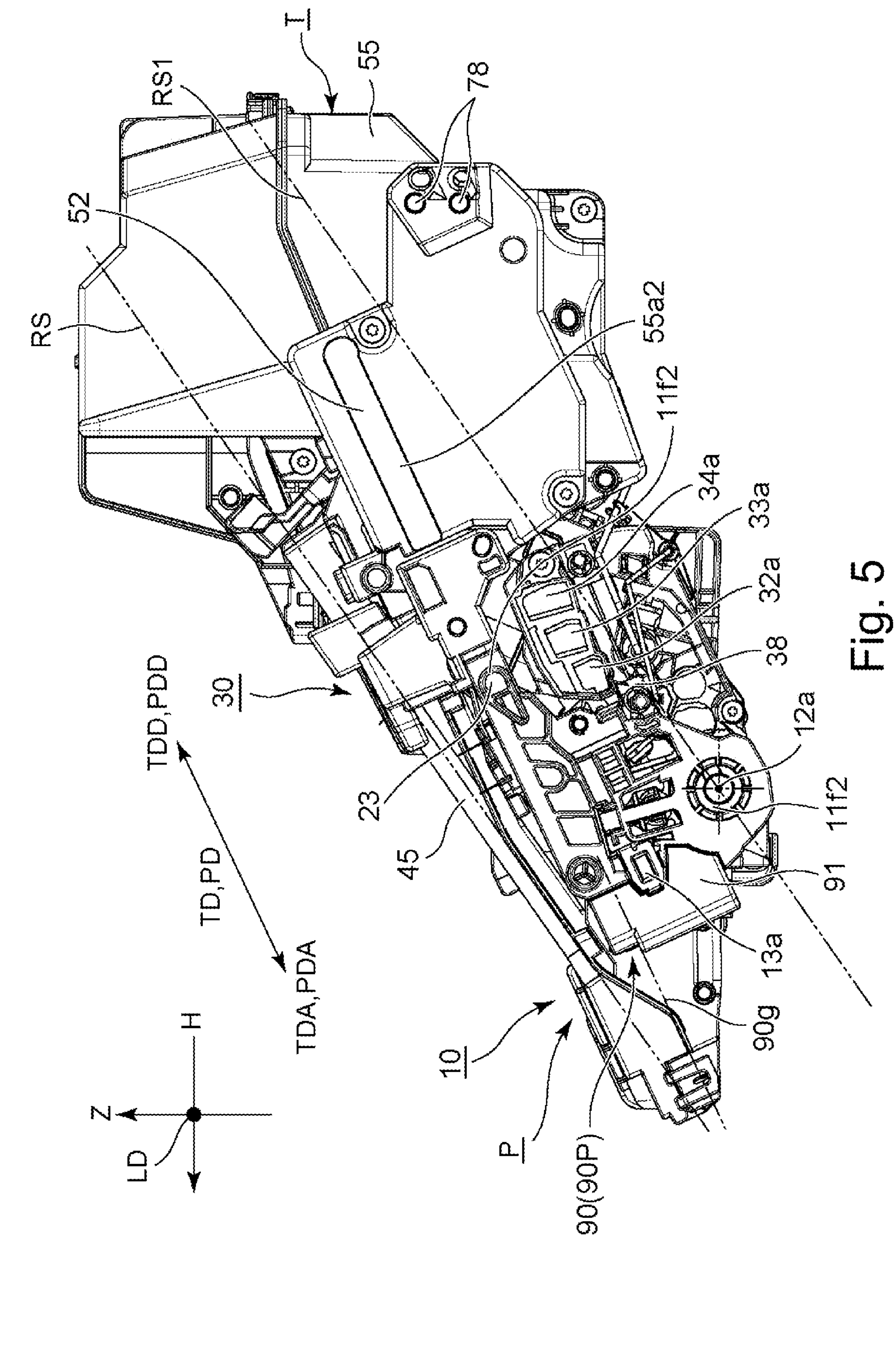
FIG. 5 is a side view of the process cartridge and the toner cartridge.

As shown in FIG. 5, the photosensitive drum 12 is rotatable about a rotational axis (first axis) 12*a*. A direction in which the rotational axis 12*a* extends is referred to as a rotational axis direction (axial direction).

Figure 4:
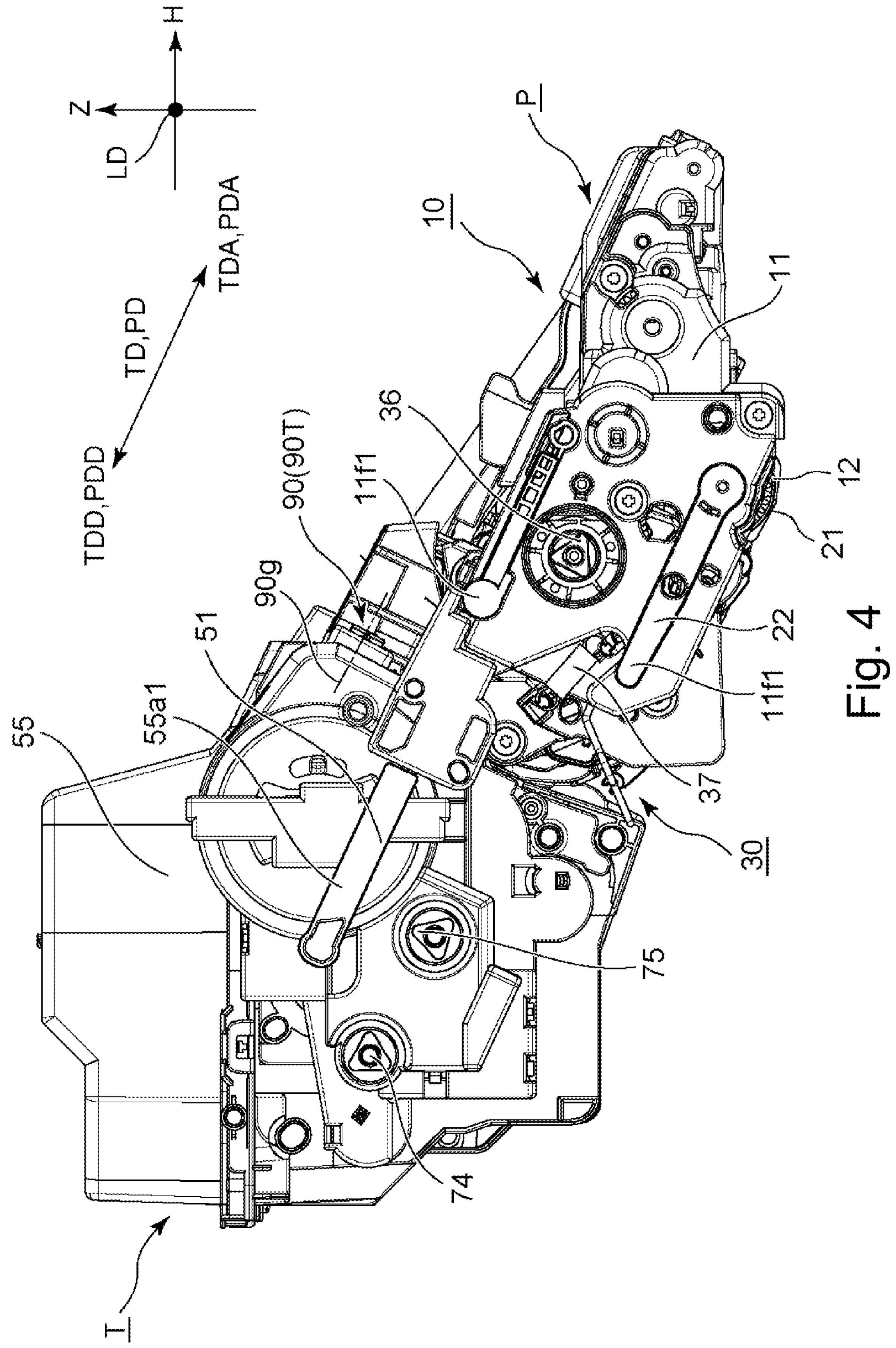
FIG. 4 is a side view of the process cartridge and the toner cartridge.

FIG. 2 is the perspective view of the process cartridge P and the toner cartridge T as viewed from a driving side. FIG. 3 is the perspective view of the process cartridge P and the toner cartridge T as viewed from a non-driving side. FIG. 4 is the side view of the process cartridge P and the toner cartridge T on the driving side as viewed in the rotational axis direction of the photosensitive drum 12. FIG. 5 is the side view of the process cartridge P and the toner cartridge T on the non-driving side as viewed in the rotational axis direction of the photosensitive drum 12.

As shown in FIG. 1, the printer 100 includes a door (openable member) 100B covering an opening 100C of the apparatus main assembly 100A. The door 100B is rotatably mounted relative to the apparatus main assembly 100A. The door 100B is constituted so as to be movable between a closed position where the door 100B closes the opening 100C and an open position where the opening 100C is exposed. In a state in which the door 100B is in the open position, through the opening 100C, mounting of the process cartridge P and the toner cartridge C into the apparatus main assembly 100A and demounting of the process cartridge P and the toner cartridge C from the apparatus main assembly 100A are permitted.

As shown in FIGS. 2 and 3, with respect to the rotational axis direction of the photosensitive drum 12, the drum frame 11 includes a process drive end (first end of the drum frame 11) 11*f*1 and a process non-drive end (second end of the drum frame 11) 11*f*2 opposite from the process drive end 11*f*1. The process drive end 11*f*1 and the process non-drive end 11*f*2 are portions (ends) positioned on outermost sides of the drum frame 11 with respect to the rotational axis direction of the photosensitive drum 12. Each of the process drive end 11*f*1 and the process non-drive end 11*f*2 may be provided at a plurality of positions. With respect to the rotational axis direction of the photosensitive drum 12, a center of the drum frame 11 is referred to as a center 11*f*3. A distance from the center 11*f*3 of the drum frame 11 to the process drive end 11*f*1 and a distance from the center 11*f*3 of the drum frame 11 to the process non-drive end 11*f*2 are equal to each other.

In this embodiment, the process drive end 11*f*1 and the process non-drive end 11*f*2 are portions (ends) positioned on outermost sides of the process cartridge P with respect to the rotational axis direction of the photosensitive drum 12. That is, with respect to the rotational axis direction of the photosensitive drum 12, the process drive end 11*f*1 and the process non-drive end 11*f*2 coincide with a drive end (first end of the process cartridge P) of the process cartridge P and a non-drive end (second end of the process cartridge P) of the process cartridge P, respectively.

With respect to the rotational axis direction of the photosensitive drum 12, a side where the process drive end 11*f*1 is disposed relative to the center 11*f*3 of the drum frame 11 is a driving-side of the drum frame 11 or a driving-side of the process cartridge P. With respect to the rotational axis direction of the photosensitive drum 12, a side where the process non-drive end 11*f*2 is disposed relative to the center 11*f*3 is a non-driving-side of the drum frame 11 or a non-driving-side of the process cartridge P. In this embodiment, with respect to the rotational axis direction of the photosensitive drum 12, the center 11*f*3 of the drum frame 11 is the same as a center of the process cartridge P.

With respect to the rotational axis direction of the photosensitive drum 12, the driving-side of the drum frame 11 and the driving-side of the process cartridge P are positioned on sides opposite from the non-driving-side of the drum frame 11 and the non-driving-side of the process cartridge P, respectively.

As described later, the toner feeding member 62 is rotatable about a rotational axis 62*a*. A direction in which the rotational axis 62*a* extends is referred to as a rotational axis direction (axial direction) of the toner feeding member 62.

The toner feeding screw 63 is rotatable about a rotational axis 63*a*. A direction in which the rotational axis 63*a* extends is referred to as a rotational axis direction (axial direction) of the toner feeding screw 63.

With respect to the rotational axis direction of the toner feeding screw 63, the toner frame 55 includes a toner drive end (first end of the toner frame 55) 55*a*1 and a toner non-drive end (second end of the toner frame 55) 55*a*2 opposite from the toner drive end 55*a*1. The toner drive end 55*a*1 and the toner non-drive end 55*a*2 are portions (ends) positioned on outermost sides of the toner frame 55 with respect to the rotational axis direction of the toner feeding screw 63. Each of the toner drive end 55*a*1 and the toner non-drive end 55*a*2 may be provided at a plurality of positions. With respect to the rotational axis direction of the toner feeding screw 63, a center of the toner frame 55 is referred to as a center 55*a*3. A distance from the center 55*a*3 of the toner frame 55 to the toner drive end 55*a*1 and a distance from the center 55*a*3 of the toner frame 55 to the toner non-drive end 55*a*2 are equal to each other.

In this embodiment, the toner drive end 55*a*1 and the toner non-drive end 55*a*2 are portions (ends) positioned on outermost sides of the process cartridge P with respect to the rotational axis direction of the toner feeding screw 63. That is, with respect to the rotational axis direction of the toner feeding screw 63, the toner drive end 55*a*1 and the toner non-drive end 55*a*2 coincide with a drive end (first end of the toner cartridge T) of the toner cartridge T and a non-drive end (second end of the toner cartridge T) of the toner cartridge T, respectively.

With respect to the rotational axis direction of the toner feeding screw 63, a side where the toner drive end 55*a*1 is disposed relative to the center 55*a*3 of the toner frame 55 is a driving-side of the toner frame 55 or a driving-side of the toner cartridge T. With respect to the rotational axis direction of the toner feeding screw 63, a side where the toner non-drive end 55*a*2 is disposed relative to the center 55*a*3 is a non-driving-side of the toner frame 55 or a non-driving-side of the toner cartridge T. In this embodiment, with respect to the rotational axis direction of the toner feeding screw 63, the center 55*a*3 of the toner frame 11 is the same as a center of the toner cartridge T.

With respect to the rotational axis direction of the toner feeding screw 63, the driving-side of the toner frame 55 and the driving-side of the toner cartridge T are positioned on sides opposite from the non-driving-side of the toner frame 55 and the non-driving-side of the toner cartridge T, respectively.

In this embodiment, the rotational axis direction of the photosensitive drum 12, the rotational axis direction of the toner feeding member 62, and the rotational axis direction of the toner feeding screw 63 are parallel to each other. Accordingly, each of the rotational axis direction of the photosensitive drum 12, the rotational axis direction of the toner feeding member 62, and the rotational axis direction of the toner feeding screw 63 is simply referred to as an axial direction (first direction) LD.

In this embodiment, with respect to the axial direction LD, a position of the center 55*a*3 of the toner frame 55 and a position of the center 11*f*3 of the drum frame 11 are the same. However, the position of the center 55*a*3 of the toner frame 55 and the position of the center 11*f*3 of the drum frame 11 may be different from each other.

As shown in FIGS. 2 and 4, the process cartridge P includes a driving-side process guide 22 on the driving-side of the drum frame 11. The toner cartridge T includes a driving-side toner guide 51 on the driving-side of the toner frame 55. As shown in FIGS. 3 and 5, the process cartridge P includes a non-driving-side process guide 23 on the non-driving-side of the drum frame 11. The toner cartridge T includes a non-driving-side toner guide 52 on the non-driving-side of the toner frame 55.

A direction in which the process cartridge P is mounted in the apparatus main assembly 100A is referred to as a mounting direction PDA. A direction in which the process cartridge P is demounted from the apparatus main assembly 100A is referred to as a demounting direction PDD. The mounting direction PDA and the demounting direction PDD are collectively referred to as a mounting and demounting direction PD. The driving-side process guide 22 and the non-driving-side process guides 23 are formed along the mounting and demounting direction PD. The driving-side process guide 22 and the non-driving-side process guide 23 are guided by guiding portions of the apparatus main assembly 100A, so that the process cartridge P is moved relative to the apparatus main assembly 100A.

A direction in which the toner cartridge T is mounted in the apparatus main assembly 100A is referred to as a mounting direction TDA. A direction in which the toner cartridge T is demounted from the apparatus main assembly 100A is referred to as a demounting direction TDD. The mounting direction TDA and the demounting direction TDD are collectively referred to as a mounting and demounting direction TD. The driving-side toner guide 51 and the non-driving-side toner guides 52 are formed along the mounting and demounting direction TD. The driving-side toner guide 51 and the non-driving-side toner guide 52 are guided by guiding portions of the apparatus main assembly 100A, so that the toner cartridge T is moved relative to the apparatus main assembly 100A.

In this embodiment, the mounting and demounting direction PD is a direction crossing the axial direction LD. An angle formed by a direction perpendicular to the axial direction LD and the mounting and demounting direction PD may preferably be smaller than an angle formed by the axial direction LD and the mounting and demounting direction PD, and the mounting and demounting direction PD may further preferably be the direction perpendicular to the axial direction LD.

In this embodiment, the mounting and demounting direction TD is a direction crossing the axial direction LD. An angle formed by a direction perpendicular to the axial direction LD and the mounting and demounting direction TD may preferably be smaller than an angle formed by the axial direction LD and the mounting and demounting direction TD, and the mounting and demounting direction TD may further preferably be the direction perpendicular to the axial direction LD.

In this embodiment, the mounting and demounting direction PD and the mounting and demounting direction TD are parallel to each other, but the mounting and demounting direction PD and the mounting and demounting direction TD may be different from each other.

In this embodiment, the mounting and the demounting of the process cartridge P are performed in a state in which the toner cartridge T is not mounted in the apparatus main assembly 100A. In other words, the mounting and the demounting of the process cartridge P are performed before the mounting of the toner cartridge T in the apparatus main assembly 100A.

In the state in which the toner cartridge T is not mounted in the apparatus main assembly 100A, the process cartridge P is mounted in the apparatus main assembly 100A through the opening 100C. Further, in a state in which the process cartridge P is mounted in the apparatus main assembly 100A, the toner cartridge T is mounted in the apparatus main assembly 100A and mounted to the process cartridge P.

In a state in which the toner cartridge T and the process cartridge P are mounted in the apparatus main assembly 100A, the process cartridge P is positioned downstream of the process cartridge P with respect to the mounting direction PDA and the mounting direction TDA.

In the case where the toner cartridge T and the process cartridge P are demounted from the apparatus main assembly 100A, the toner cartridge T is demounted from the apparatus main assembly 100A and the process cartridge P through the opening 100C. Thereafter, the process cartridge P is demounted from the apparatus main assembly 100A through the opening 100C.

<Process Cartridge>

The structure of the process cartridge P will be described further specifically using FIGS. 2 to 9.

Figure 6:
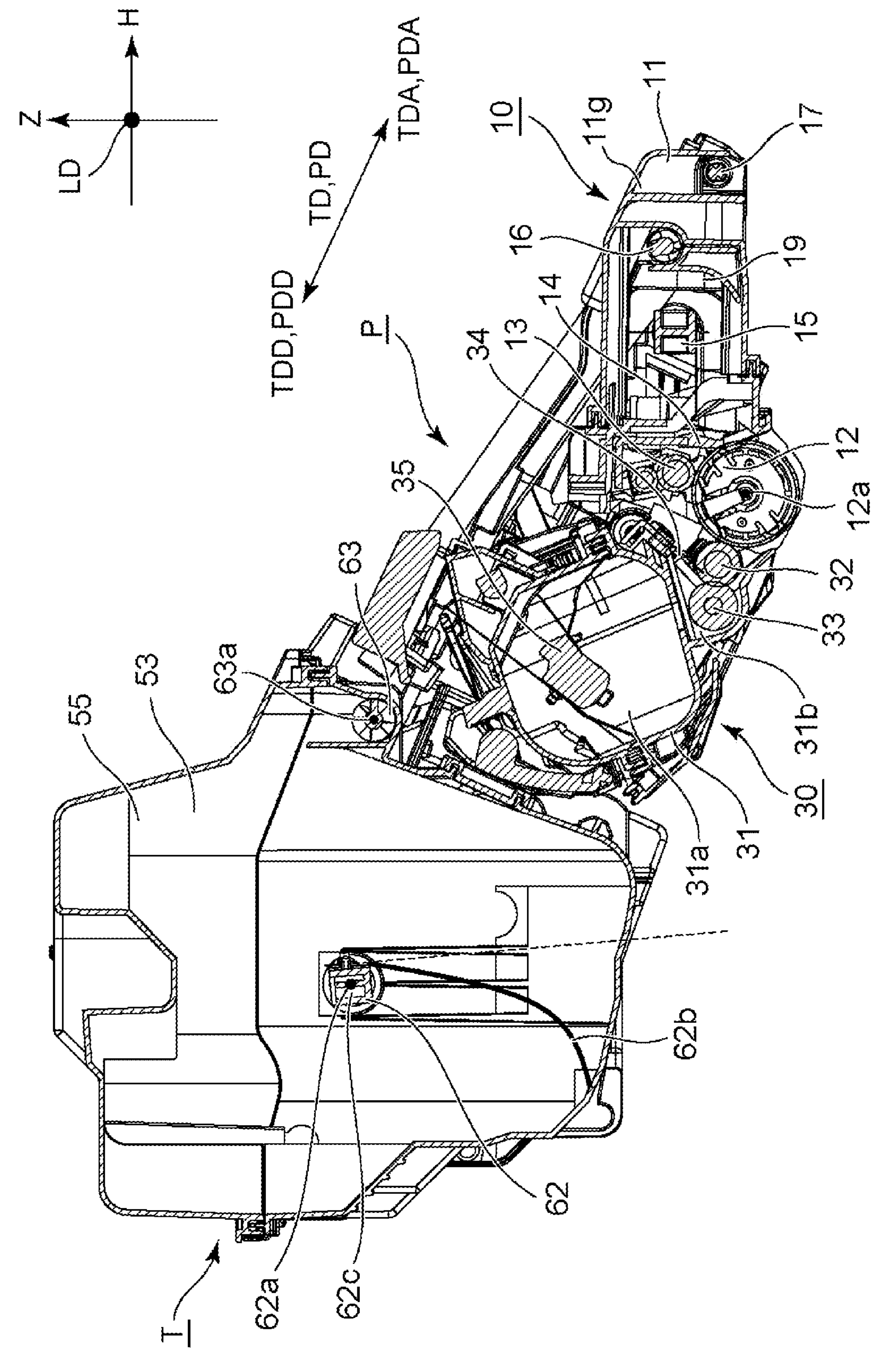
FIG. 6 is a sectional view of the process cartridge and the toner cartridge.
Figure 7:
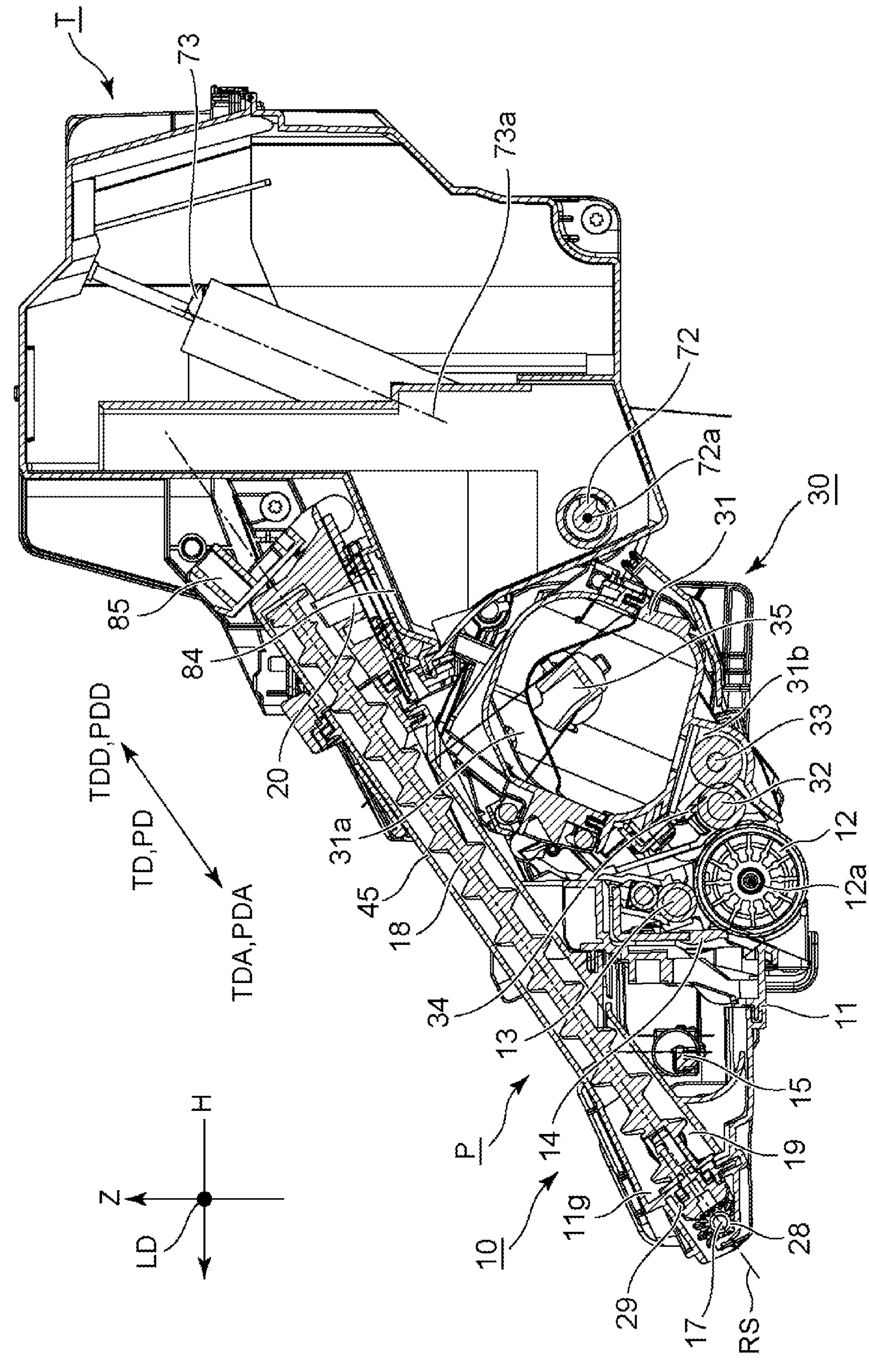
FIG. 7 is a sectional view of the process cartridge and the toner cartridge.

FIGS. 6 and 7 are sectional views of the process cartridge P and the toner cartridge T. Specifically, FIGS. 6 and 7 are the sectional views of the process cartridge P and the toner cartridge T, in which a direction perpendicular to the axial direction LD is a cross-sectional direction. FIG. 7 is the sectional view in which the process cartridge P and the toner cartridge T are cut along a rotational axis RS of a returning screw 18 described later.

Figure 8:
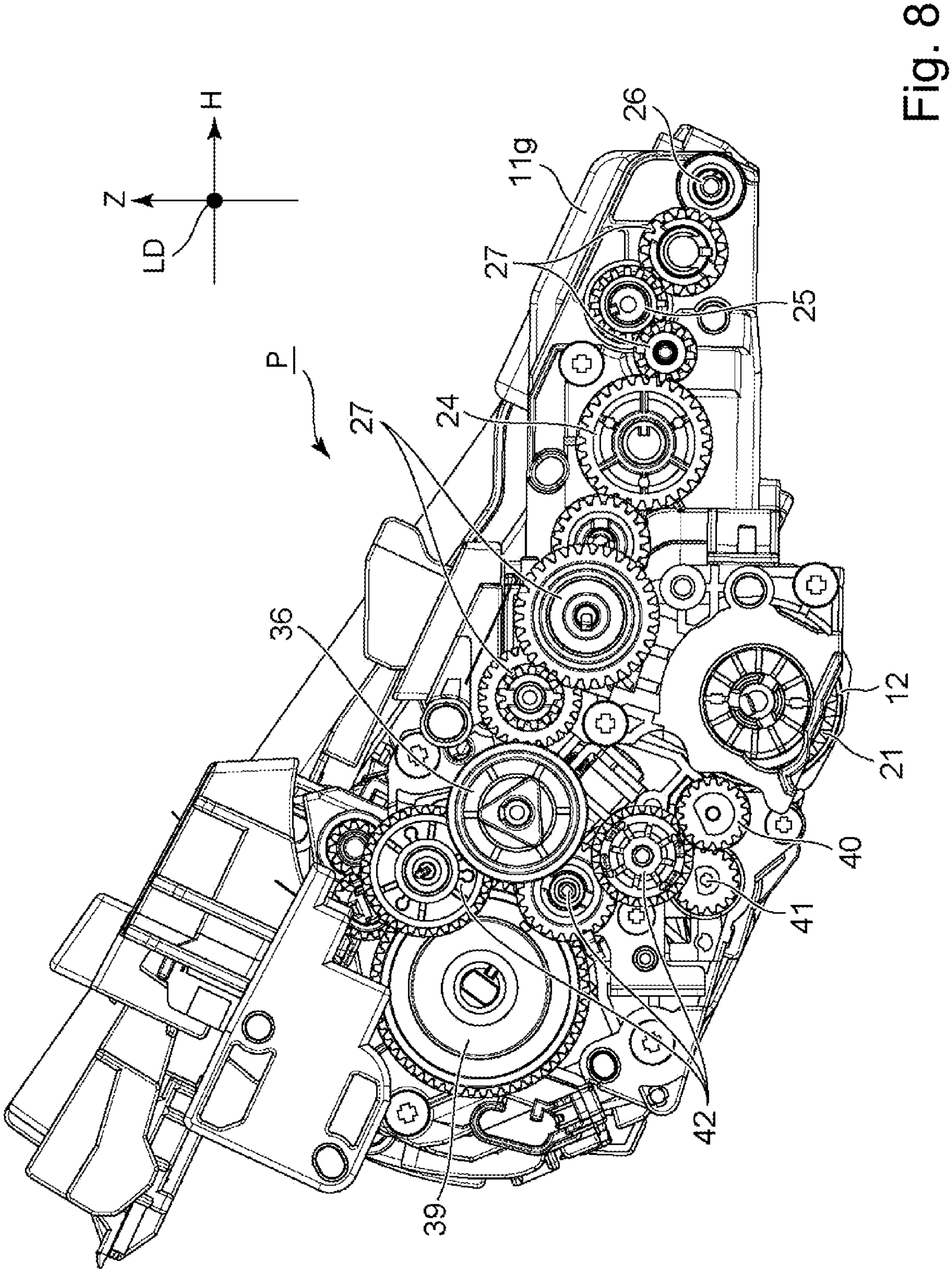
FIG. 8 is a side view for illustrating a drive transmitting path for the process cartridge.
Figure 9:
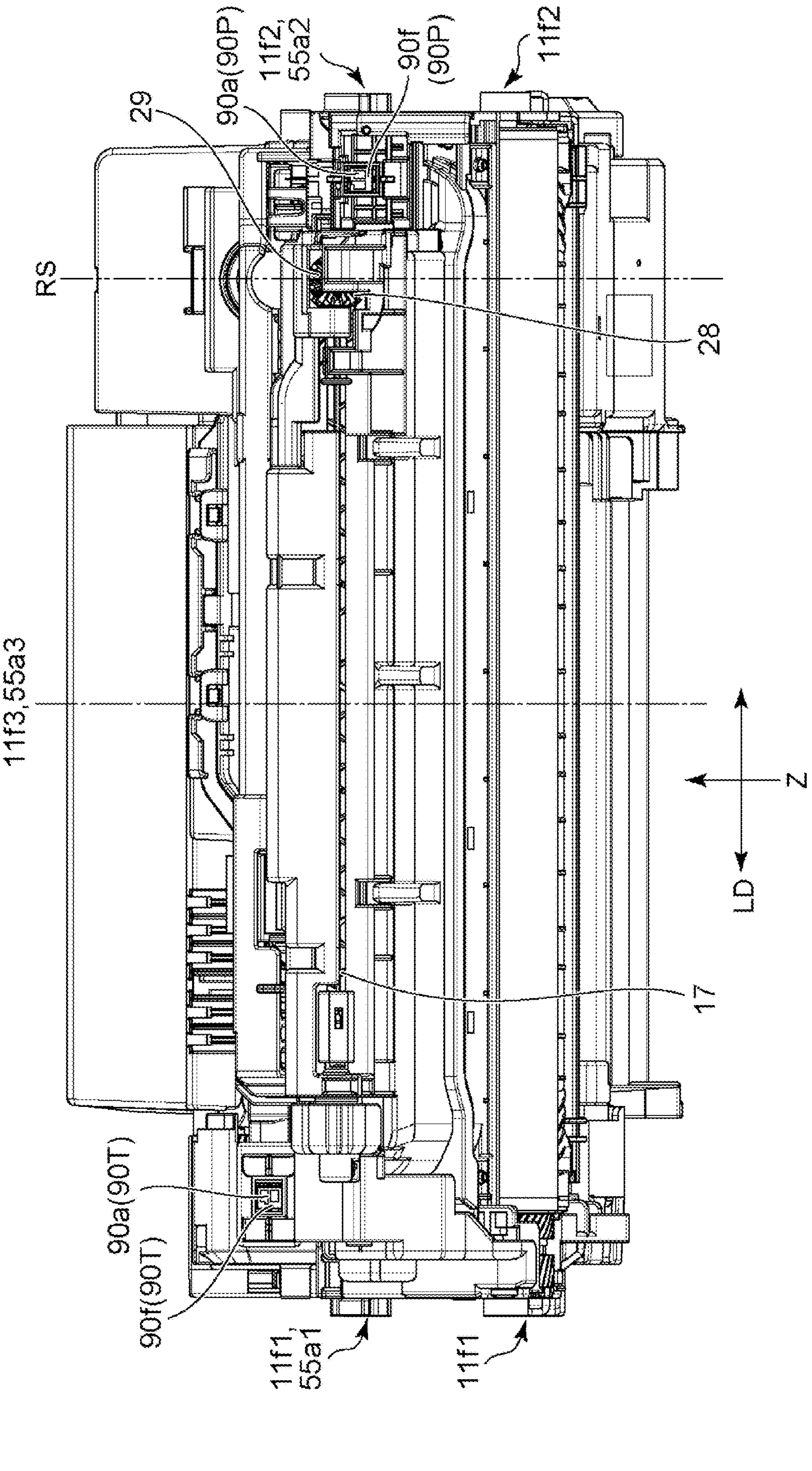
FIG. 9 is a schematic view of the process cartridge and the toner cartridge as viewed in a demounting direction.

FIG. 8 is a side view for illustrating a drive transmitting path of the process cartridge P. FIG. 9 is a schematic view of the process cartridge P and the toner cartridge T as viewed in the demounting direction PDD.

The process cartridge P includes the developing unit 30 and the drum unit 10. The developing unit 30 is connected to the drum unit 10 movably (rotatably) relative to the drum unit 10. As shown in FIGS. 4 and 5, the process cartridge P includes a driving-side spring 37 and a non-driving-side spring 38, and the driving-side spring 37 and the non-driving-side spring 38 are mounted to the drum unit 10 and the developing unit 30. The driving-side spring 37 and the non-driving-side spring 38 urge the developing unit 30 so that the developing roller 32 is pressed toward the photosensitive drum 12.

As shown in FIGS. 6 and 7, the developing unit 30 includes the developing roller 32 (developer carrying member) for carrying the toner, a supplying roller 33 (supplying member) for supplying toner in contact with the developing roller 32, a developing blade 34, and a stirring member 35. The developing frame 31 supports the developing roller 32, the supplying roller 33, the developing blade 34, and the stirring member 35. The developing frame 31 is provided with a developer accommodating chamber 31*a* and a developing chamber 31*b*. In the developer accommodating chamber 31*a*, the stirring member 35 is disposed, and in the developing chamber 31*b*, the developing roller 32, the supplying roller 33, and the developing blade 34 are disposed.

The toner supplied from the toner cartridge T is accommodated in the developer accommodating chamber 31*a*. The stirring member 35 feeds the toner, accommodated in the developer accommodating chamber 31*a*, to the developing chamber 31*b*. The toner fed to the developing chamber 31*b* is supplied to the developing roller 32 by the supplying roller 33 rotating in contact with the developing roller 32. The toner supplied to the developing roller 32 is regulated by the developing blade 34, so that a toner layer is formed on a surface of the developing roller 32. The developing blade 34 has a function as a layer thickness regulating member for regulating a thickness of the toner layer.

As shown in FIGS. 6 and 7, the drum unit 10 includes the drum frame 11, the photosensitive drum 12 (image bearing member), the charging roller 13, the cleaning blade 14, an intermediary feeding member 15, an intermediary screw 16, a transmission shaft 17, and the returning screw 18. The drum frame 11 supports the photosensitive drum 12, the charging roller 13, the cleaning blade 14, the intermediary feeding member 15, the intermediary screw 16, the transmission shaft 17, and the returning screw 18. Further, the drum unit 10 includes a memory tag 90P described later.

The drum frame 11 includes a cleaning collecting chamber 19. In the cleaning collecting chamber 19, the intermediary feeding member 15, the intermediary screw 16, and the returning screw 18 are disposed.

As shown in FIG. 7, the drum frame 11 is provided with a returning path 45 including the returning screw 18. The returning path 45 can be said as a part of the cleaning collecting chamber 19.

The charging roller 13 contacts the photosensitive drum 12 and is rotated by the photosensitive drum 12. The cleaning blade 14 contacts the photosensitive drum 12 and collects the toner remaining on the surface of the photosensitive drum 12. The collected toner (waste toner, residual toner, collected toner) is accommodated in the cleaning collecting chamber 19. The collected toner is fed toward the intermediary screw 16 by the intermediary frame member 15, and the intermediary screw 16 feeds the collected toner toward the returning screw 18. The intermediary feeding member 15 feeds the collected toner toward a direction crossing the axial direction LD. The intermediary screw 16 feeds the collected toner along the axial direction LD.

The returning screw (rotatable member) 18 rotates about the rotational axis (second axis) RS. A direction in which the rotational axis RS of the returning screw 18 extends is referred to as a rotational axis direction (second direction) of the returning screw 18.

The rotational axis direction of the returning screw 18 is a direction crossing the axial direction LD. An angle formed by a direction perpendicular to the axial direction LD and the rotational axis direction of the returning screw 18 may preferably be smaller than an angle formed by the axial direction LD and the rotational axis direction of the returning screw 18, and the rotational axis direction of the returning screw 18 may further preferably be the direction perpendicular to the axial direction LD.

As shown in FIG. 7, the drum frame 11 is provided with a returning opening 20. The returning opening 20 communicates with the returning path 45 of the cleaning collecting chamber 19 and an outside of the drum frame 11, and opposes the returning screw 18. The collected toner delivered from the intermediary screw 16 to the returning screw 18 is fed toward the returning opening 20 by the returning screw 18, and is discharged through the returning opening 20, and then passes through a toner receiving opening 84 described later and is received by the toner cartridge T.

Thus, the returning screw 18 has a function as a feeding member for feeding, toward the toner receiving opening 84, the toner collected from the photosensitive drum 12. A direction in which the returning screw 18 feeds the collected toner is a direction from the process cartridge P toward the toner cartridge T and is an upward direction with respect to a vertical direction.

The returning screw 18 includes a helical fin and a screw shaft and feeds the toner toward the returning opening 20 by being rotated about the rotational axis RS. The helical fin and the screw shaft are formed integrally with each other.

As shown in FIGS. 2 and 4, the process cartridge P includes a process coupling (first input portion, development driving member) and a drum gear 21 (second input portion, drum driving member). The process coupling 36 engages with a main assembly coupling of the apparatus main assembly 100A, so that a driving force (external force) is transmitted from the apparatus main assembly 100A to the process coupling 36. The drum gear 21 engages with a main assembly gear of the apparatus main assembly 100, so that the driving force (external force) is transmitted from the apparatus main assembly 100A to the drum gear 21, and thus the drum gear 21 is rotated. The drum gear 21 is rotated, so that the photosensitive drum 12 is driven and rotated.

In this embodiment, the process coupling 36 and the drum gear 21 are disposed on the driving-side of the process cartridge P. That is, with respect to the axial direction LD, a distance between the process drive end 11*f*1 and the process coupling 36 is shorter than a distance between the process non-drive end 11*f*2 and the process coupling 36. Similarly, with respect to the axial direction LD, a distance between the process drive end 11*f*1 and the drum gear 21 is shorter than a distance between the process non-drive end 11*f*2 and the drum gear 21. That is, with respect to the axial direction LD, the process coupling 36 and the drum gear 21 are closer to the process drive end 11*f*1 than to the process non-drive end 11*f*2.

As shown in FIG. 8, the process cartridge P includes a stirring gear 39 for driving the stirring member 35, a developing gear 40 for driving the developing roller 32, and a supplying gear 41 for driving the supplying roller 33. The stirring gear 39, the developing gear 40, and the supplying gear 41 are connected to the process coupling 36 via a plurality of idler gears 42, and by rotation of the process coupling 36, the developing roller 32, the supplying roller 33, and the stirring member 35 are driven and rotated.

Further, the process cartridge includes an intermediary feeding gear 24 for driving the intermediary feeding member 15, an intermediary screw gear 25 for driving the intermediary screw 16, and a shaft gear 26 for driving the transmission shaft 17. The intermediary feeding gear 24, the intermediary screw gear 25, and the shaft gear 26 are connected to the process coupling 36 via a plurality of idler gears 27, and by rotation of the process coupling 36, the intermediary feeding member 15, the intermediary screw 16, and the transmission shaft 17 are rotated.

The returning path 45 and the returning screw 18 are disposed on the non-driving-side of the process cartridge P (see, FIGS. 2, 3 and 9). That is, with respect to the axial direction LD, a distance between the returning screw 18 and the process non-drive end 11*f*2 is shorter than a distance between the returning screw 18 and the process drive end 11*f*1. That is, with respect to the axial direction LD, the returning screw 18 is closer to the process drive end 11*f*1 than to the process non-drive end 11*f*2.

More specifically, as shown in FIG. 9, with respect to the axial direction LD, a distance between the rotational axis RS and the process non-drive end **11*f*2 is shorter than a distance between the rotational axis RS and the process drive end 11*f*1**.

Further, with respect to the axial direction LD, the distance between the rotational axis RS and the process non-drive end **11*f*2 is shorter than a distance between the rotational axis RS and the center 11*f*3 of the drum frame 11. That is, with respect to the axial direction LD, the rotational axis RS is closer to the process non-drive end 11*f*2 than to the process drive end 11*f*1 and the center 11*f*3 of the drum frame 11**.

As shown in FIG. 7, a transmission gear 28 is mounted on the transmission shaft 17, and a returning gear 29 engageable with the transmission gear 28 each other is mounted on the returning screw 18. Each of the transmission gear 28 and the returning gear 29 is a bevel gear, and by rotation of the transmission shaft 17, the returning screw 18 is rotated. That is, the driving force transmitted to the process coupling 36 is transmitted from the driving-side of the process cartridge P to the non-driving-side of the process cartridge P by the transmission shaft 17, and then is transmitted to the returning screw 18. That is, the process coupling 36 is constituted so as to drive the returning screw 18.

As shown in FIG. 9, the transmission shaft 17 is disposed on an outside of the cleaning collecting chamber 19, so that the transmission gear 28 and the returning gear 29 engage with each other on the outside of the cleaning collecting chamber 19.

As shown in FIGS. 3 and 5, on the non-driving-side of the process cartridge P, a developing roller electrode (developing roller contact) **32*a*, a developing blade electrode (developing blade contact) 34*a*, a supplying roller electrode (supplying roller contact) 33*a*, and a charging roller electrode (charging roller contact) 13*a* are provided. That is, with respect to the axial direction LD, a distance between the process non-drive end 11*f*2 and the charging roller electrode 13*a* is shorter than a distance between the process drive end 11*f*1 and the charging roller electrode 13*a*. Similarly, with respect to the axial direction LD, a distance between the process non-drive end 11*f*2 and each of the developing roller electrode 32*a*, the developing blade electrode 34*a*, and the supplying roller electrode 33*a* is shorter than a distance between the process drive end 11*f*1 and each of the developing roller electrode 32*a*, the developing blade electrode 34*a*, and the supplying roller electrode 33*a*. That is, with respect to the axial direction LD, each of the charging roller electrode 13*a*, the developing roller electrode 32*a*, the developing blade electrode 34*a*, the supplying roller electrode 33*a* is closer to the process non-drive end 11*f*2 than to the process drive end 11*f*1**.

The developing roller electrode **32*a*, the developing blade electrode 34*a*, the supplying roller electrode 33*a*, and the charging roller electrode 13*a* are connected to the developing roller 32, the developing blade 34, the supplying roller 33, and the charging roller 13, respectively. When the image forming operation is performed, predetermined voltages are applied from power sources of the apparatus main assembly 100A to the developing roller electrode 32*a*, the developing blade electrode 34*a*, the supplying roller electrode 33*a*, and the charging electrode 13*a***, respectively.

A material of each of the developing roller electrode **32*a*, the developing blade electrode 34*a*, the supplying roller electrode 33*a*, and the charging roller electrode 13*a*** may be metal or an electroconductive resin.

Incidentally, in this embodiment, directions of rotational axes of the developing roller 32, the supplying roller 33, the stirring member 35, the charging roller, the intermediary feeding member 15, the intermediary screw 16, and the transmission shaft 17 are parallel to the axial direction LD. Directions of rotational axes of the gears except for the process coupling 36, the drum gear 21, and the returning gear 29 are also parallel to the axial direction LD.

<Toner Cartridge>

The structure of the toner cartridge T according to this embodiment will be described further specifically using FIGS. 6, 7, and 10 to 16.

Parts (a) and (b) of FIG. 10 and parts (a) and (b) of FIG. 11 are perspective views of the toner cartridge T. Specifically, parts (a) and (b) of FIG. 10 are the perspective views of the toner cartridge T as viewed from the driving-side. In part (b) of FIG. 10, a part of the toner cartridge T is omitted. Parts (a) and (b) of FIG. 11 are the perspective views of the toner cartridge T as viewed from the non-driving-side. In part (b) of FIG. 11, a part of the toner cartridge T is omitted.

FIG. 12 is a schematic view of the toner cartridge T as viewed in the demounting direction TDD. FIG. 13 is a schematic view showing an inside structure of the toner cartridge T. FIG. 14 is a sectional view of the toner cartridge T, in which a direction perpendicular to the axial direction LD is a cross-sectional direction.

FIGS. 15 and 16 are side views of the toner cartridge T. Specifically, parts (a) and (b) of FIG. 15 are the side views of the toner cartridge T as viewed in the axial direction LD. FIG. 16 is the side view of the toner cartridge T on the non-driving-side as viewed in the axial direction LD.

As shown in FIGS. 6 and 13, the toner frame 55 of the toner cartridge T is provided with a toner accommodating chamber (first chamber) 53 and a toner collecting chamber (second chamber) 54. In the toner accommodating chamber 53, the toner supplied to the process cartridge P is accommodated. In the toner collecting chamber 54, the toner returned from the process cartridge P by the returning screw 18 is accommodated.

The toner collecting chamber 54 and the toner accommodating chamber 53 are separated (spaced) from each other. Specifically, the toner frame 55 includes a partition wall **55*b*, and the toner collecting chamber 54 and the toner accommodating chamber 53 are (completely) separated from each other by the partition wall 55*b*. By this, the toner is prevented from moving between the toner collecting chamber 54 and the toner accommodating chamber 53, so that the toner accommodated in the toner collecting chamber 54 and the toner accommodated in the toner accommodating chamber 53** are prevented from being mixed with each other.

A volume of the toner accommodating chamber 53 is larger than a volume of the toner collecting chamber 54. In this embodiment, with respect to the axial direction LD, a distance between the partition wall **55*b* and the toner non-drive end 55*a*2 is shorter than a distance between the partition wall 55*b* and the toner drive end 55*a*1. That is, with respect to the axial direction LD, the partition wall 55*b* is closer to the toner non-drive end 55*a*2 than to the toner drive end 55*a*1**.

With respect to the axial direction LD, the toner accommodating chamber 53 is disposed so as to overlap with the center **55*a*3 of the toner frame 55. On the other hand, with respect to the axial direction LD, the toner collecting chamber 54 is disposed on the non-driving-side of the toner frame 55. With respect to the axial direction LD, a distance between the toner collecting chamber 54 and the toner non-drive end 55*a*2 is shorter than a distance between the toner collecting chamber 54 and the toner drive end 55*a*1. That is, the toner collecting chamber 54 is closer to the toner non-drive end 55*a*2 than to the toner drive end 55*a*1**.

Further, with respect to the axial direction LD, the toner collecting chamber 54 is disposed between the toner accommodating chamber 53 and the toner non-drive end 55*a*2.

As shown in FIGS. 12 and 13, the toner frame 55 includes a container portion 56 provided with the toner accommodating chamber 53 and the toner collecting chamber 54, a driving-side cover 57 provided on the driving-side of the toner cartridge T, and a non-driving-side cover 58 provided on the non-driving-side of the toner cartridge T.

The container portion 56 includes a first container 56*a* provided with the toner accommodating chamber 53 and a second container 56*b* provided with the toner collecting chamber 54. The second container 56*b* is fixed to the first container 56*a*.

In this embodiment, a side wall of the first container 56*a* and a side wall of the second container 56*b* oppose each other, and have a function as the partition wall 55*b*.

As shown in parts (a) and (b) of FIG. 10, the toner frame 55 is provided with a toner discharge opening (first opening) 61 for permitting discharge of the toner, accommodated in the toner accommodating chamber 53, toward the developing unit 30 of the process cartridge P. The toner discharge opening 61 communicates with the outside of the toner frame 55 and the toner accommodating chamber 53, so that the toner accommodated in the toner accommodating chamber 53 is discharged to the outside of the toner frame 55 through the toner discharge opening 61. The toner discharge opening 61 is provided in the first container 56*a*.

With respect to the axial direction LD, the toner discharge opening 61 is disposed on the driving-side of the toner frame 55. With respect to the axial direction LD, a distance between the toner discharge opening 61 and the toner drive end 55*a*1 is shorter than a distance between the toner discharge opening 61 and the toner non-drive end 55*a*2. That is, with respect to the axial direction LD, the toner discharge opening 61 is closer to the toner drive end 55*a*1 than to the toner non-drive end 55*a*2.

The toner discharge opening 61 is covered with an unshown discharge opening shutter. The discharge opening shutter is opened and closed in interrelation with mounting and demounting of the toner cartridge T relative to the process cartridge P. In a state in which the toner cartridge T is mounted to the process cartridge P, discharge of the toner through the toner discharge opening 61 is permitted. As described above, the developing roller 32 develops the electrostatic latent image, formed on the photosensitive drum 12, with the toner discharged through the toner discharge opening 61.

As shown in FIGS. 6 and 13, inside the toner accommodating chamber 53, the toner feeding member 62 and the toner feeding screw 63 are accommodated. The toner feeding member 62 and the toner feeding screw 63 can be called a first rotatable member of the toner cartridge T.

As shown in FIGS. 13 and 14, the toner cartridge T includes a toner discharging device 64 for discharging the toner through the toner discharge opening 61.

The toner discharging device 64 includes a pump portion 65 for sending air by being compressed, and air guide 66 for guiding the air sent by the pump portion 65 toward the toner discharge opening 61, a compressing portion 67 for compressing the pump portion 65, and an actuating gear 68 for moving the compressing portion 67. The actuating gear 68 is provided with an actuating groove 68*a* for moving the compressing portion 67.

The toner feeding member 62 includes a flexible fin 62*b* and a shaft 62*c* on which the fin 62*b* is mounted, and feeds the toner toward the toner feeding screw 63 by being rotated about a rotational axis 62*a*. As shown in FIG. 14, the fin 62*b* contacts an inner wall of the toner accommodating chamber 53 and is deformed from a natural state indicated by a broken line, and thus feeds the toner. The toner feeding screw 63 includes a helical fin 63*b*1 and a screw shaft 63*b*2 and is rotated about a rotational axis 63*a*, so that the toner is fed toward the toner discharge opening 61. The helical fin 63*b*1 and the screw shaft 63*b*2 are formed integrally with each other.

On the other hand, the actuating gear 68 is rotated, so that the compressing portion 67 engaging with the actuating groove 68*a* moves in a direction of the rotational axis of the actuating gear 68. The compressing portion 67 is moved and thus the pump portion 65 is compressed, so that the pump portion 65 sends the air toward the toner accommodating chamber 53.

The sent air is guided toward the toner discharge opening 61 by an air guide 66. Incidentally, in the neighborhood of the toner discharge opening 61, a cover member is provided and covers a part of the toner feeding screw 63. By this, the toner fed by the toner feeding member 62 is suppressed that the toner is directly discharged through the toner discharge opening 61, and the air dissipated from the air guide 66 is efficiently moved toward the toner discharge opening 61.

Further, as shown in parts (a) and (b) of FIG. 10, the toner frame 55 is provided with a toner receiving opening (second opening) 84 through which receives the toner returned from the process cartridge P. The toner receiving opening 84 communicates with the outside of the toner frame 55 and the toner collecting chamber 54. The toner collecting chamber 54 accommodates toner (collected toner) discharged through the toner returning opening 20 and passing through the toner receiving opening 84.

With respect to the axial direction LD, the toner receiving opening 84 is disposed on the non-driving-side of the toner frame 55. That is, with respect to the axial direction LD, a distance between the toner receiving opening 84 and the toner non-drive end 55*a*2 is shorter than a distance between the toner receiving opening 84 and the toner drive end 55*a*1. Further, with respect to the axial direction LD, a distance between the toner receiving opening 84 and the toner non-drive end 55*a*2 is shorter than a distance between the toner receiving opening 84 and the center 55*a*3 of the toner frame 55. That is, with respect to the axial direction LD, the toner receiving opening 84 is closer to the toner non-drive end 55*a*2 than to the center 55*a*3 of the toner frame 55.

The toner receiving opening 84 is covered with a receiving opening shutter 85. The receiving opening shutter 85 is opened and closed in interrelation with mounting and demounting of the toner cartridge T relative to the process cartridge P.

More specifically, the receiving opening shutter 85 is movable between a closed position where the receiving opening shutter 85 covers the toner receiving opening 84 and an open position where the toner receiving opening is exposed. As shown in FIG. 7, the toner cartridge T is mounted to the process cartridge P, so that the receiving opening shutter 85 is contacted to the process cartridge P and is moved to the open position. In a state in which the toner cartridge T is mounted to the process cartridge P, the toner receiving opening 84 and the toner returning opening 20 oppose each other.

As shown in FIG. 13, the toner collecting chamber 54 includes a first collecting chamber 69, a second collecting chamber 70, and a third collecting chamber 71. The toner cartridge T includes a first collecting screw 72 for feeding the toner from the first collecting chamber 69 to the second collecting chamber 70 and a second collecting screw (second rotatable member) 73 for feeding the toner from the second collecting chamber 70 to the third collecting chamber 71. The first collecting screw 72 and the second collecting screw 73 and accommodated in the toner collecting chamber 54.

As shown in FIG. 7, the first collecting screw 72 is rotatable about a rotational axis 72*a*, and the second collecting screw 73 is rotatable about a rotational axis 73*a*. A direction of the rotational axis 72*a* is parallel to the axial direction LD, and a direction of the rotational axis 73*a* is a direction crossing the axial direction LD. An angle formed by a direction perpendicular to the axial direction LD and the direction of the rotational axis 73*a* may preferably be shorter than an angle formed by the axial direction LD and the direction of the rotational axis 73*a*, and the direction of the rotational axis 73*a* may further preferably be the direction perpendicular to the axial direction LD.

The toner received through the toner receiving opening 83 is accumulated in the first collecting chamber 69 and is fed from the first collecting chamber 69 to the second collecting chamber 70 by the first collecting screw 72. The toner fed to the second collecting chamber 70 is fed upward with respect to a vertical direction by the second collecting screw 73 and thus fed from the second collecting chamber 70 to the third collecting chamber 71.

As shown in parts (a) and (b) of FIG. 15, the toner cartridge T includes a second toner coupling 74, a first toner coupling 75, a feeding gear 76, and a discharging gear 77.

The actuating gear 68, the second toner coupling 74, the first toner coupling 75, the feeding gear 76, and the discharging gear 77 are provided on the driving-side of the toner cartridge T. That is, with respect to the axial direction LD, a distance between each of the second toner coupling 74 and the first toner coupling 75 and the toner drive end 55*a*1 is shorter than a distance between each of the second toner coupling 74 and the first toner coupling 75 and the toner non-drive end 55*a*2. That is, with respect to the axial direction LD, each of the second toner coupling 74 and the first toner coupling 75 is closer to the toner drive end 55*a*1 than to the toner non-drive end 55*a*2.

The driving end cover 57 covers at least a part of the actuating gear 68, the second toner coupling 74, the first toner coupling 75, the feeding gear 76, and the discharging gear 77, and includes a toner driving end guide 51. The driving end covers at least a part of the pump portion 65.

The feeding gear 76 is connected to the toner feeding member 62, and the discharging gear 77 is connected to the toner feeding screw 63. The second toner coupling 74 receives a driving force (external force) from the apparatus main assembly 100A and rotates the feeding gear 76. As a result, the toner feeding member 62 is rotated.

The first toner coupling 75 engages with the actuating gear 68 through idler gears, and the actuating gear 68 engages with the discharging gear 77. The first toner coupling 75 receives the driving force (external force) from the apparatus main assembly 100A and rotates the actuating gear 68 and the discharging gear 77. As a result, the pump portion 65 is compressed, so that the toner feeding screw 63 is rotated.

That is, the second toner coupling 74 has a function as a driving member for driving the toner feeding member 62. The first toner coupling 75 has a function as a driving member for driving the toner discharging device 64 and the toner feeding screw 63.

As shown in FIG. 16, the toner cartridge T includes a detecting member 78 for detecting a toner amount in the toner collecting chamber 54. The toner non-driving end cover 58 covers the detecting member 78 and includes the toner non-driving end guide 52.

In this embodiment, the detecting member 78 is a light guide pair for guiding the light. The detecting member 78 includes light guiding members 78*a*1 and 78*a*2 and is disposed on the non-driving-side of the toner cartridge. That is, with respect to the axial direction LD, a distance between each of the light guiding members 78*a*1 and 78*a*2 and the toner non-drive end 55*a*2 is shorter than a distance between each of the light guiding members 78*a*1 and 78*a*2 and the toner drive end 55*a*1. That is, with respect to the axial direction LD, each of the light guiding members 78*a*1 and 78*a*2 is closer to the toner non-drive end 55*a*2 than to the toner drive end 55*al*.

Each of parts of the light guiding members 78*a*1 and 78*a*2 is exposed to the toner collecting chamber 54. One of the light guiding members 78*a*1 and 78*a*2 guides the light from an outside to an inside of the toner collecting chamber 54. The light guided to the inside of the toner collecting chamber 54 passes through the toner collecting chamber 54. The other one of the light guiding members 78*a*1 and 78*a*2 guides the light from the inside to the outside of the toner collecting chamber 54.

The controller 107 of the apparatus main assembly 100A is capable of detecting the toner amount on the basis of the light passing through the inside of the toner collecting chamber 54 through the light guiding members 78*a*1 and 78*a*2. Incidentally, as the detecting member 78, a pair of electrodes opposing each other can also be used. In this case, the controller 107 of the apparatus main assembly 100A is capable of detecting the toner amount on the basis of a change in electrostatic capacity between the electrodes.

<Memory>

A structure of the memory will be described using FIG. 17. FIG. 17 is an illustration of a memory tag 90.

The process cartridge P in this embodiment includes the memory tag 90P as the memory for storing information on the process cartridge P. Further, the toner cartridge T includes a memory tag 90T as a memory for storing information on the toner cartridge T.

As the information stored, for example, information on use history of the process cartridge P and the toner cartridge T is included.

The memory tag 90P of the process cartridge P and the memory tag 90T of the toner cartridge C have similar shapes. When the memory tag 90P and the memory tag 90T are not discriminated from each other or when a matter common to the memory tag 90P and the memory tag 90T is described, the memory tag 90P and the memory tag 90T will be simply referred to as the memory tag 90.

As shown in FIG. 17, the memory tag 90 in this embodiment includes a storing element 90*d* for storing information on the process cartridge P or the toner cartridge T, and an electroconductive portion (electrode portion, interface portion, memory contact) 90*a* electrically connected to the storing element 90*d*.

The electroconductive portion 90*a* includes a first electrode (first terminal, first memory electrode, first memory contact) 90*a*1 and a second electrode (second terminal, second memory electrode, second memory contact) 90*a*2, and each of the first electrode 90*a*1 and the second electrode 90*a*2 is electrically connected to the storing element 90*d*.

The memory tag 90 includes a holding portion (holding substrate) 90*b* for holding the electroconductive portion 90*a* (first electrode 90*a*1, second electrode 90*a*2). The memory tag 90 includes a protecting portion 90*c* for covering and protecting the storing element 90*d*. In this embodiment, the electroconductive portion 90*a* is disposed on one surface (front surface) of the holding portion 90*b*, and the storing element 90*d* is disposed on the other surface (back surface) of the holding portion 90*b*.

The memory tag 90 in this embodiment is a plate-like member of 5.5 mm×5 mm in size and 1.4 mm in thickness. The holding portion 90*b* and the protecting portion 90*c* are provided integrally with each other. The memory tag 90 has a two-layer structure formed by the holding portion 90*b* and the protecting portion 90*c*. By the holding portion 90*b* and the protecting portion 90*c*, a substrate portion (substrate) 90*f* provided with the electroconductive portion 90*a* is formed.

The substrate 90*f* has a front surface 90*f*1 on which the electroconductive portion 90*a* is disposed, and a back surface 90*f*2 opposite from the front surface 90*f*1.

The controller 107 of the printer 100 reads the information stored in the storing element 90*d* by being electrically connected to the storing element 90*d* through the electroconductive portion 90*a* and thus controls the printer 100.

Specifically, the apparatus main assembly 100A is provided with a main assembly contact (main assembly electrode) 92 contacting the electroconductive portion 90*a* in a state in which the process cartridge P and the toner cartridge T and mounted in the apparatus main assembly 100A. The main assembly contact 92 includes a first main assembly electrode 92*a*1 and a second main assembly electrode 92*a*2. In the state in which the process cartridge P and the toner cartridge T are mounted in the apparatus main assembly 100A, the first main assembly electrode 92*a*1 contacts the first electrode 90*al*, and the second main assembly electrode 92*a*2 contacts the second electrode 90*a*2.

In this embodiment, the number of the electrodes disposed at the electroconductive portion 90*a* is two, but the present invention is not limited thereto. For example, the electroconductive portion 90*a* may include three or more electrodes. Further, one electrode is disposed on the holding portion 90*b*, and another electrode may be disposed on a different portion.

Further, the holding portion 90*b* and the protecting portion 90*c* may be disposed in positions spaced from each other. For example, a substrate provided with the electroconductive portion 90*a* and a substrate provided with the storing element 90*d* may be disposed in spaced positions.

<Arrangement of Memory Tag of Process Cartridge>

An arrangement of the memory tag 90P of the process cartridge P will be described using FIGS. 3, 5, and 18 to 22.

FIG. 18 is a perspective view showing the arrangement of the memory tag 90P of the process cartridge P. FIG. 19 is a top view showing the arrangement of the memory tag 90P of the process cartridge P. FIG. 20 is a sectional view showing the arrangement of the memory tag 90P of the process cartridge P. FIGS. 19 and 20 are schematic views in which the memory tag 90P is viewed in a direction parallel to the surface 90*f*1 on which the electroconductive portion 90*a* is disposed and perpendicular to the axial direction LD.

FIG. 21 is a perspective view for illustrating a mounting member 91. FIG. 22 is a side view showing the arrangement of the memory tag 90P of the process cartridge P. FIG. 21 is a perspective view showing a state before the memory tag 90P of the process cartridge P and the mounting member 91 on which the memory tag 90P is mounted are mounted. FIG. 22 is a side view showing the mounting member 91 on which the memory tag 90P of the process cartridge P is mounted.

The substrate 90*f* of the memory tag 90P is mounted on the drum frame 11. More specifically, the drum frame 11 includes a collecting container (container) 11*g* provided with the cleaning collecting chamber 19 and includes the mounting member 91 on which the memory tag 90P is mounted. The collecting container 11*g* is provided with the cleaning collecting chamber 19 and a cleaning opening 19*a* communicating with the cleaning collecting chamber 19. The mounting member 91 is mounted on the collecting container 11*g* so as to cover the cleaning opening 19*a*. In this embodiment, the mounting member 91 is bonded to the collecting container 11*g*. The substrate 90*f* of the memory tag 90P is supported by the mounting member 91.

The mounting member 91 of the process cartridge P is disposed on the non-driving-side of the process cartridge P. With respect to the axial direction LD, a distance between the mounting member 91 and the process non-drive end 11*f*2 is shorter than a distance between the mounting member 91 and the process drive end 11*f*1.

With respect to the axial direction LD, the mounting member 91 is disposed in the neighborhood of the process non-drive end 11*f*2. With respect to the axial direction LD, a distance between the process non-drive end 11*f*2 and the mounting member 91 is shorter than a distance between the center 11*f*3 and the mounting member 91. That is, with respect to the axial direction LD, the mounting member 91 is closer to the process non-drive end 11*f*1 than to the center 11*f*3 of the drum frame 11.

With respect to the axial direction LD, entirety of the memory tag 90P is disposed between the process drive end 11*f*1 and the process non-drive end 11*f*2. In this embodiment, with respect to the axial direction LD, the entirety of the memory tag 90P is disposed between the process non-drive end 11*f*2 and the center 11*f*3 of the drum frame 11. In other words, the entire memory tag 90P is disposed on the non-driving-side of the drum frame 11 (on the non-driving-side of the process cartridge P).

With respect to the axial direction LD, a distance between the electroconductive portion 90*a* of the memory tag 90P and the process non-drive end 11*f*2 is shorter than a distance between the electroconductive portion 90*a* of the memory tag 90P and the process drive end 11*f*1. Further, with respect to the axial direction LD, a distance between the memory tag 90P and the process non-drive end 11*f*2 is shorter than a distance between the memory tag 90P and the process drive end 11*f*1.

With respect to the axial direction LD, a distance between the process non-drive end 11*f*2 and the electroconductive portion 90*a* of the memory tag 90P is shorter than a distance between the center 11*f*3 of the drum frame 11 and the electroconductive portion 90*a* of the memory tag 90P. Further, with respect to the develop LD, a distance between the process non-drive end 11*f*2 and the memory tag 90P is shorter than a distance between the center 11*f*3 of the drum frame 11 and the memory tag 90P. That is, with respect to the axial direction LD, the electroconductive portion 90*a* of the memory tag 90P and the memory tag 90P are closer to the process non-drive end 11*f*2 than to the process drive end 11*f*1 and to the center 11*f*3 of the drum frame 11.

As shown in FIG. 5, as viewed in the axial direction LD, the electroconductive portion 90*a* of the memory tag 90P is disposed between the rotational axis RS of the returning screw 18 and a rectilinear line RS1 which is parallel to the rotational axis RS of the returning screw 18 and which passes through a rotation center of the photosensitive drum 12. As viewed in the axial direction LD, the rotational center of the photosensitive drum 12 coincide with the rotational axis 12*a* of the photosensitive drum 12. That is, the electroconductive portion 90*a* of the memory tag 90P is positioned between the rotational axis RS of the returning screw 18 and the rotational axis 12*a* of the photosensitive drum 12 with respect to a direction perpendicular to the rotational axis RS of the returning screw 18 and the axial direction LD. In this embodiment, as viewed in the axial direction LD, the entire memory tag 90P is disposed between the rotational axis RS of the returning screw 18 and the rectilinear line RS1.

By this, the returning screw 18, the photosensitive drum 12, the memory tag 90P, and the electroconductive portion 90*a* can be disposed in a space-saving manner.

In this embodiment, as viewed in the axial direction LD, the charging roller electrode 13*a*, the developing roller electrode 32*a*, the developing blade electrode 34*a*, and the supplying roller electrode 33*a* are disposed between the rotational axis RS and the rectilinear line RS1. The charging roller electrode 13*a*, the developing roller electrode 32*a*, the developing blade electrode 34*a*, and the supplying roller electrode 33*a* are disposed between the rotational axis RS and the rotational axis 12*a* with respect to the direction perpendicular to the rotational axis RS and the axial direction LD.

By this, the returning screw 18, the photosensitive drum 12, the charging roller electrode 13*a*, the developing roller electrode 32*a*, the developing blade electrode 34*a*, and the supplying roller electrode 33*a* can be disposed in a space-saving manner.

Further, as shown in FIG. 9, with respect to the axial direction LD, a distance between the electroconductive portion 90*a* of the memory tag 90P and the process non-drive end 11*f*2 is shorter than a distance between the rotational axis RS of the returning screw 18 and the process non-drive end 11*f*2. That is, with respect to the axial direction LD, the electroconductive portion 90*a* of the memory tag 90P is closer to the process non-drive end 11*f*2 than the rotational axis RS of the returning screw 18 is.

As shown in FIG. 5, the memory tag 90P is disposed so that the electroconductive portion 90*a* directs in a direction crossing the axial direction LD. Specifically, a normal direction 90*g* to the surface 90*f*1 where the electroconductive portion 90*a* is disposed crosses the axial direction LD. An angle formed by a direction perpendicular to the axial direction LD and by the normal direction 90*g* may preferably be smaller than an angle formed by the axial direction LD and the normal direction 90*g*, and the normal direction 90*g* may more preferably be the direction perpendicular to the axial direction LD.

Further, as shown in FIGS. 3, 4, and 9, the electroconductive portion 90*a* is disposed so as to direct the mounting direction PDA. In other words, with respect to the mounting direction PDA, the electroconductive portion 90*a* is disposed on a side downstream of the substrate 90*f*. Further, an angle formed by the mounting and demounting direction PD and the normal direction 90*g* may preferably be smaller than an angle formed by a direction perpendicular to the mounting and demounting direction PD and by the normal direction 90*g*, and the normal direction 90*g* may more preferably be parallel to the mounting and demounting direction PD.

Incidentally, in this embodiment, as viewed in the axial direction LD, the normal direction 90*g* is inclined in a direction of the rotational axis RS of the returning screw 18.

As shown in FIGS. 19 and 20, the drum frame 11 includes a first photosensitive drum 91*a*, a second projected portion 91*b*, a third projected portion 91*c*, and a fourth projected portion 91*d*. At least a part of the fourth projected portion 91*d* has a function as a wall for forming the toner collecting chamber 19.

In this embodiment, the first projected portion 91*a*, the second projected portion 91*b*, the third projected portion 91*c*, and the fourth projected portion 91*d* are provided on the non-driving-side of the drum frame 11. With respect to the axial direction LD, a distance between the process non-drive end 11*f*2 and each of the first projected portion 91*a* and the second projected portion 91*b* is shorter than a distance between the process drive end 11*f*1 and each of the first projected portion 91*a* and the second projected portion 91*b*. With respect to the axial direction LD, a distance between the process non-drive end 11*f*2 and each of the third projected portion 91*c* and the fourth projected portion 91 is shorter than a distance between the process drive end 11*f*1 and each of the third projected portion 91*c* and the fourth projected portion 91*d*.

Further, with respect to the axial direction LD, a distance between the process non-drive end 11*f*2 and each of the first projected portion 91*a* and the second projected portion 91*b* is shorter than a distance between the center 11*f*3 of the drum frame 11 and each of the first projected portion 91*a* and the second projected portion 91*b*. Further, with respect to the axial direction LD, a distance between the process non-drive end 11*f*2 and each of the third projected portion 91*c* and the fourth projected portion 91*d* is shorter than a distance between the center 11*f*3 of the drum frame 11 and each of the third projected portion 91*c* and the fourth projected portion 91*d*.

That is, with respect to the axial direction LD, the first projected portion 91*a*, the second projected portion 91*b*, the third projected portion 91*c*, and the fourth projected portion 91*d* are closer to the process non-drive end 11*f*2 than to the process drive end 11*f*1 and to the center 11*f*3.

Further, with respect to the axial direction LD, a distance between the process non-drive end 11*f*2 and each of the first projected portion 91*a* and the second projected portion 91*b* is shorter than a distance between the process non-drive end 11*f*2 and each of the substrate 90*f* and the electroconductive portion 90*a*. With respect to the axial direction LD, a distance between the process non-drive end 11*f*2 and each of the third projected portion 91*c* and the fourth projected portion 91*d* is longer than a distance between the process non-drive end 11*f*2 and each of the substrate 90*f* and the electroconductive portion 90*a*. That is, with respect to the axial direction LD, the first projected portion 91*a* and the second projected portion 91*b* are closer to the process non-drive end 11*f*2 than the substrate 90*f* and the electroconductive portion 90*a* are. Further, with respect to the axial direction LD, the third projected portion 91*c* and the fourth projected portion 91*d* are remoter from the process non-drive end 11*f*2 than the substrate 90*f* and the electroconductive portion 90*a* are.

With respect to the axial direction LD, the first projected portion 91*a* and the third projected portion 91*c* are adjacent to the substrate 90*f* and oppose side surfaces perpendicular to the surface 91*f*1 of the holding portion 90*b* on which the electroconductive portion 90*a* is disposed. With respect to the axial direction LD, the electroconductive portion 90*a* of the memory tag 90P are disposed between the first projected portion 91*a* and the third projected portion 91*c*. In this embodiment, at least one of the first projected portion 91*a* and the third projected portion 91*c* contacts the substrate 90 of the memory tag 90P.

Further, with respect to the axial direction LD, a distance between the second projected portion 91*b* and the process non-drive end 11*f*2 is shorter than a perpendicular to between the first projected portion 91*a* and the process non-drive end 11*f*2. That is, with respect to the axial direction LD, the second projected portion 91*b* is closer to the process non-drive end 11*f*2 than the first projected portion 91*a* is. With respect to the axial direction LD, the first projected portion 91*a* is disposed between the second projected portion 91*b* and the memory tag 90P, and the second projected portion 91*b* is disposed between the first projected portion 91*a* and the process non-drive end 11*f*2.

Further, with respect to the axial direction LD, a distance between the fourth projected portion 91*d* and the process non-drive end 11*f*2 is longer than a distance between the third projected portion 91*c* and the process non-drive end 11*f*2. That is, with respect to the axial direction LD, the fourth projected portion 91*d* is remoter from the process non-drive end 11*f*2 than the third projected portion 91*c* is. A distance between the fourth projected portion 91*d* and the process drive end 11*f*1 is shorter than a distance between the third projected portion 91*c* and the process drive end 11*f*1. That is, with respect to the axial direction LD, the fourth projected portion 91*d* is closer to the process drive end 11*f*1 than the third projected portion 91*c* is. That is, with respect to the axial direction LD, the third projected portion 91*c* is disposed between the substrate 90*f* and the process drive end 11*f*1, and the fourth projected portion 91*d* is disposed between the third projected portion 91*c* and the process drive end 11*f*1.

Here, a direction which is parallel to the normal direction 90*g* of the surface 90*f*1 of the holding portion 90*b* of the memory tag 90P and in which the electroconductive portion 90*a* is exposed is defined as an exposure direction 90*g*1. That is, the exposure direction 90*g*1 can be said as a direction in which the electroconductive portion 90*a* faces. In this embodiment, the exposure direction 90*g*1 is parallel to the mounting direction PDA.

As shown in FIG. 9, as viewed in a direction opposite to the exposure direction 90*g*1, the entire surface 90*f*1 of the substrate 90*f* of the memory tag 90P is exposed. In this embodiment, the substrate 90*f* is bonded to the mounting member 91 of the drum frame 11, so that movement of the substrate 90*f* in the exposure direction 90*g*1 is restricted.

With respect to the exposure direction 90*g*1, the first projected portion 91*a*1 and the third projected portion 91*c* are projected relative to the surface 90*f*1 and the electroconductive portion 90*a* of the memory tag 90P, the second projected portion 91*b* is projected relative to the first projected portion 91*a*, and the fourth projected portion 91*d* is projected relative to the third projected portion 91*c*.

In other words, with respect to the exposure direction 90*g*1, a tip 91*a*1 of the first projected portion 91 and a tip 91*c* of the third projected portion 91*c* are positioned downstream of the surface 90*f*1 and the electroconductive portion 90*a*. Further, a tip 91*b*1 of the second projected portion 91*b* and a tip 91*d*1 of the fourth projected portion 91*d* are positioned downstream of the tip 91*a*1 of the first projected portion 91*a* and the tip 91*cl* of the third projected portion 91*c*. Further, with respect to the exposure direction 90*g*1, the tip 91*d*1 of the fourth projected portion 91*d* is positioned downstream of the tip 91*b*1 of the second projected portion 91*b*.

With respect to the normal direction 90*g* of the memory tag 90P, a distance between the tip 91*b*1 of the second projected portion 91*b* and the tip 91*a*1 of the first projected portion 91*a* is longer than a distance between the electroconductive portion 90*a* and the tip 90*a*1 of the first projected portion 91*a*. A distance between the tip 91*d*1 of the fourth projected portion 91*d* and the tip 91*c*1 of the third projected portion 91*c* is longer than a distance between the electroconductive portion 90*a* and the tip 91*c* of the third projected portion 91*c*.

With respect to the rotational axis 12*a* direction of the photosensitive drum 12, a distance between the tip 91*b*1 of the second projected portion 91*b* and the tip 91*a*1 of the first projected portion 91*a* is longer than a distance between the electroconductive portion 90*a* and the tip 90*a*1 of the first projected portion 91*a*. A distance between the tip 91*d*1 of the fourth projected portion 91*d* and the tip 91*c*1 of the third projected portion 91*c* is longer than a distance between the electroconductive portion 90*a* and the tip 91*c* of the third projected portion 91*c*.

In other words, with respect to the exposure direction 90*g*1, a length of projection of the second projected portion 91*b* relative to the first projected portion 91*a* is longer than a length of projection of the first projected portion 91*a* relative to the surface 90*f*1. With respect to the exposure direction 90*g*1, a length of projection of the fourth projected portion 91*d* relative to the third projected portion 91*c* is longer than a length of projection of the third projected portion 91*c* relative to the surface 90*f*1.

At an end portion of the second projected portion 91*b* with respect to the exposure direction 90*g*1, an inclined surface 91*b*2 inclined with respect to the axial direction LD and the exposure direction 90*g*1.

Further, with respect to the axial direction LD, a distance between the first projected portion 91*a* and the second projected portion 91*b* is longer than a distance between the substrate 90*f* of the memory tag 90P and the first projected portion 91*a*. A distance between the third projected portion 91*c* and the fourth projected portion 91*d* is longer than a distance between the substrate 90*f* of the memory tag 90P and the third projected portion 91*c*.

Further, as shown in FIG. 22, as viewed in the axial direction LD, at least a part of the substrate 90*f* of the memory tag 90P overlaps with the second projected portion 91*b*.

The drum frame 11 is provided with a reinforcing rib connected to at least either one of the first projected portion 91*a* and the third projected portion 91*c*. Specifically, as shown in FIG. 18, to the first projected portion 91*a* and the third projected portion 91*c*, a connecting portion 91*g*1 provided between the first projected portion 91*a* and the third projected portion 91*c* with respect to the axial direction LD is connected. To the first projected portion 91*a*, a connecting portion 91*g*2 provided between the first projected portion 91*a* and the second projected portion 91*b* with respect to the axial direction LD is connected. To the third projected portion 91*c*, a connecting portion 91*g*3 provided between the third projected portion 91*c* and the fourth projected portion 91*d* with respect to the axial direction LD is connected.

Each of the connecting portions 91*g*1, 91*g*2, and 91*g*3 is a rib (reinforcing rib) which projects in the exposure direction 90*g*1 and which extends in the axial direction LD. Each of the connecting portions 91*g*1 and 91*g*2 has a function of reinforcing the first projected portion 91*a*. Each of the connecting portions 91*g*1 and 91*g*3 has a function of reinforcing the third projected portion 91*c*. In this embodiment, the connecting portions 91*g*1, 91*g*2, and 91*g*3 are provided on the mounting member 91.

The number of each of the connecting portions 91*g*1, 91*g*2, and 91*g*3 may preferably be a plurality of numbers, but at least one of the connecting portions 91*g*1, 91*g*2, and 91*g*3 may be a single connecting portion. In this embodiment, two connecting portions 91*a*1 are connected to each other via the first projected portion 91*a* and the third projected portion 91*c*. Two connecting portions 91*a*2 are also connected to each other via a connecting portion (reinforcing rib), and two connecting portions 91$a$3 are also connected to each other via a connecting portion (reinforcing rib).

By the first projected portion 91$a$, the second projected portion 91$b$, the third projected portion 91$c$, and the fourth projected portion 91$d$, the memory tag 90P can be protected.

Further, it can also be said that the second projected portion 91$b$ and the fourth projected portion 91$d$ have a function of protecting the first projected portion 91$a$ and the third projected portion 91$c$ which are adjacent to the memory tag 90P. By this, it is suppressed that an external force is exerted on the first projected portion 91$a$ and the third projected portion 91$c$ which are disposed in the neighborhood of the substrate 90$f$ of the memory tag 90P and deforms the first projected portion 91$a$ and the third projected portion 91$c$.

Further, in a state in which the process cartridge P is mounted in the apparatus main assembly 100A, the memory tag 90P is inclined with respect to the horizontal direction and the vertical direction Z so that the electroconductive portion 90$a$ directs downward with respect to the vertical direction Z.

As shown in FIG. 21, the mounting member 91 includes the first projected portion 91$a$, the second projected portion 91$b$, and the third projected portion 91$c$. The collecting container 11$g$ includes the fourth projected portion 91$d$. Between the first projected portion 91$a$ and the third projected portion 91$c$, a memory mounting portion 91$e$ on which the memory tag 90P is mounted is formed. That is, the memory tag 90P is supported by the mounting member 91 of the drum frame 11 at the memory mounting portion 91$e$. The memory mounting portion (supporting portion) 91$e$ supports, the substrate 90$f$ of the memory tag 90P.

When the process cartridge P used up is collected and then is re-utilized, the toner is removed from the cleaning collecting chamber 19 in some cases. According to a constitution described in this embodiment, in the case where the mounting member 91 is removed from the collecting container 11$g$, the cleaning opening 19$a$ is exposed, so that the toner can be removed from the cleaning collecting chamber 19.

Further, also in the case where at least one of the first projected portion 91$a$, the second projected portion 91$b$, and the third projected portion 91$c$ is deformed, by exchanging the mounting member 91, the drum frame 11 can be restored to a state in which the first projected portion 91$a$, the second projected portion 91$b$, and the third projected portion 91$c$ are not deformed.

Further, by demounting the mounting member 91 from the collecting container 11$g$, the memory tag 90P can be demounted from the process cartridge P. In the case where the process cartridge P is re-utilized, the memory tag 90P mounted on the used-up process cartridge P is re-utilized by rewriting information or is exchanged to another memory tag 90P is some cases.

In order to close the cleaning opening 91$a$ after the mounting member 91 is removed from the collecting container 11$g$, the mounting member 91 is mounted again on the collecting container 11$g$. At this time, the demounted mounting member 91 may be used again or another mounting member 91 may also be used.

In summary, the demounted memory tag 90P and the demounted mounting member 91 may be re-utilized. Further, at least either one of the memory tag 90P and the mounting member 91 may be exchanged to a new component part.

<Arrangement of Memory of Toner Cartridge>

An arrangement of the memory tag 90T of the toner cartridge T will be described using FIGS. 10 to 13 and 15 to 17.

As shown in FIGS. 10 to 13, the substrate 90$f$ of the memory tag 90T of the toner cartridge T is mounted on the toner frame 55. More specifically, the memory tag 90T of the toner cartridge T is supported by a supporting portion 57$a$ of the driving-side cover 57 which is a part of the toner frame 55.

The memory tag 90T is disposed so that the electroconductive portion 90$a$ directs in a direction crossing the axial direction LD. Accordingly, an angle formed by the normal direction 90$g$ of the surface 90$f$1 and a direction perpendicular to the axial direction LD is smaller than an angle formed by the normal direction 90$g$ of the surface 90$f$1 and the axial direction LD. In this embodiment, the normal direction 90$g$ of the surface 90$f$1 is parallel to the direction perpendicular to the axial direction LD. Accordingly, the above-described angle formed is 0 degrees.

Further, the electroconductive portion 90$a$ of the memory tag 90T is disposed so as to direct the mounting direction TDA. In other words, with respect to the mounting direction TDA, the electroconductive portion 90$a$ is disposed on a side downstream of the substrate 90$f$. Further, an angle formed by the mounting and demounting direction TD and the normal direction 90$g$ may preferably be smaller than an angle formed by a direction perpendicular to the mounting and demounting direction TD and by the normal direction 90$g$, and the normal direction 90$g$ may more preferably be parallel to the mounting and demounting direction TD.

Further, in a state in which the toner cartridge T is mounted in the apparatus main assembly 100A, the memory tag 90T is inclined with respect to the horizontal direction and the vertical direction so that the electroconductive portion 90$a$ directs downward with respect to the vertical direction.

As shown in FIGS. 12 and 13, with respect to the axial direction LD, the entire memory tag 90T is disposed between the toner drive end 55$a$1 and the toner non-drive end 55$a$2. In this embodiment, with respect to the axial direction LD, the entire memory tag 90T is disposed between the toner drive end 55$a$1 and the center 55$a$3 of the toner frame 55. In other words, with respect to the axial direction LD, the entirety of the memory tag 90T is disposed on the driving-side of the toner frame 55 (on the driving-side of the toner cartridge T).

With respect to the axial direction LD, a distance between the electroconductive portion 90$a$ of the memory tag 90T and the toner drive end 55$a$1 is shorter than a distance between the electroconductive portion 90$a$ of the memory tag 90T and the toner non-drive end 55$a$2. Further, the distance between the electroconductive portion 90$a$ of the memory tag 90T and the toner drive end 55$a$1 is shorter than a distance between the electroconductive portion 90$a$ of the memory tag 90T and the center 55$a$3 of the toner frame 55. That is, with respect to the axial direction LD, the electroconductive portion 90$a$ of the memory tag 90T is closer to the toner drive end 55$a$1 than to the toner non-drive end 55$a$2 and to the center 55$a$3 of the toner frame 55. With respect to the axial direction LD, the electroconductive portion 90$a$ of the memory tag 90T is disposed between the toner discharge opening 61 and the toner drive end 55$a$1.

In this embodiment, with respect to the axial direction LD, a distance between the entire memory tag 90T and the toner drive end 55$a$1 is shorter than a distance between the entire memory tag 90T and the toner non-drive end 55$a$2. Further, the distance between the entire memory tag 90T and the toner drive end **55*a*1 is shorter than a distance between the entire memory tag 90T and the center 55*a*3 of the toner frame 55. That is, with respect to the axial direction LD, the entire memory tag 90T is closer to the toner drive end 55*a*1 than to the toner non-drive end 55*a*2 and to the center 55*a*3 of the toner frame 55. With respect to the axial direction LD, the entire memory tag 90T is disposed between the toner discharge opening 61 and the toner drive end 55*a*1**.

Further, with respect to the axial direction LD, a distance between the toner discharge opening 61 and the toner drive end **55*a*1 is shorter than a distance between the toner discharge opening 61 and the toner non-drive end 55*a*2. A distance between the toner receiving opening 84 and the toner non-drive end 55*a*2 is shorter than a distance between the toner receiving opening 84 and the toner drive end 55*a*1**.

With respect to the axial direction LD, a distance between the electroconductive portion **90*a* and the toner drive end 55*a*1 is shorter than a distance between the toner drive end 55*a*1 and the toner collecting chamber 54. Further, a distance between the electroconductive portion 90*a* and the toner non-drive end 55*a*2 is longer than a distance between the toner collecting chamber 54 and the toner non-drive end 55*a*2. Further, the distance between the electroconductive portion 909*a* and the toner drive end 55*a*1 is shorter than a distance between the toner drive end 55*a*1 and the partition wall 55*b*. The distance between the electroconductive portion 90*a* and the toner drive end 55*a*1 is shorter than a distance between the toner drive end 55*a*1 and the toner discharge opening 84. That is, with respect to the axial direction LD, the electroconductive portion 90*a* is closer to the toner drive end 55*a*1 than to each of the toner collecting chamber 54, the partition wall 55*b*, and the toner receiving opening 84**.

That is, in the toner cartridge T in this embodiment, the toner collecting chamber 54 and the toner receiving opening 84 were disposed on the non-driving-side of the toner cartridge T, and the electroconductive portion **90*a* of the memory tag 90T was disposed on the driving-side of the memory tag 90**T.

The distance between the electroconductive portion **90*a* and the toner drive end 55*a*1 is shorter than a distance between the toner drive end 55*a*1 and the toner discharge opening 61. Further, the distance between the electroconductive portion 90*a* and the toner drive end 55*a*1 is shorter than a distance between the toner accommodating chamber 53 and the toner drive end 55*a*1. That is, with respect to the axial direction LD, the electroconductive portion 90*a* is closer to the toner drive end 55*a*1 than the toner discharge opening 61 and the toner accommodating chamber 53** are.

Further, with respect to the axial direction LD, a region (range) in which the pump portion 65 exists and a region (range) in which the memory tag 90T and the electroconductive portion **90*a*** exist at least partially overlap with each other.

By this, with respect to the axial direction LD, the pump portion 65 and the electroconductive portion **90*a*** can be disposed in a space-saving manner.

By this, a degree of design freedom of each of the toner accommodating chamber 53, the toner collecting chamber 54, the toner discharge opening 61, the toner receiving opening 84, the memory tag 90T, and the electroconductive portion **90*a* can be improved. For example, it is possible to easily ensure a space in which the toner collecting chamber 54 and the toner receiving opening 84 are disposed and a space in which the electroconductive portion 90*a* of the memory tag 90T and the main assembly contact 92** are disposed.

Further, with respect to the axial direction LD, a gap is formed between the electroconductive portion **90*a*, the toner discharge opening 61, and the toner receiving opening 84 (these portions are disposed and shifted from each other), so that deposition of the toner on the electroconductive portion 90*a* is suppressed. The electroconductive portion 90*a* is disposed on the driving-side of the toner frame 55, and the toner receiving opening 84 is disposed on the non-driving-side of the toner frame 55, so that deposition of the collected toner on the electroconductive portion 90*a*** is suppressed.

When the toner cartridge T is mounted in the apparatus main assembly 100A and is mounted to the process cartridge P, reaction forces from the apparatus main assembly 100A and the process cartridge P act on the memory tag 90T of the toner cartridge T, a shutter (not shown) for closing the toner discharge opening 61, and the receiving opening shutter 85 for closing the toner receiving opening 84. When the memory tag 90T, the toner discharge opening 61, and the toner receiving opening 84 are collectively disposed on the driving-side or the non-driving-side, the reaction forces acting on these portions concentrated at the driving-side or the non-driving-side, so that the toner cartridge T is inclined. On the other hand, the memory tag 90T, the toner discharge opening 61, and the toner receiving opening 84 are disposed and distributed to the driving-side and the non-driving-side, so that concentration of the reaction force is suppressed and thus the inclination of the toner cartridge T is suppressed.

<Positioning of Toner Cartridge and Arrangement of Memory Tag>

A relationship between a constitution regarding positioning of the toner cartridge T and an arrangement of the memory tag 90T will be described using FIG. 12, part (a) of FIG. 15, and FIG. 23. FIG. 23 is a sectional view for illustrating mounting of the toner cartridge T to the process cartridge P.

FIG. 23 is the sectional view in which a state that the toner cartridge T is mounted in the apparatus main assembly 100A is viewed from the driving-side of the toner cartridge T. Incidentally, in FIG. 23, a part of components of the toner cartridge T is omitted.

The toner cartridge T includes a portion-to-be-positioned **55*cl* positioned by the process cartridge P and a force receiving portion 55*c*2 pressed by the apparatus main assembly 100A. Each of the portion-to-be-positioned 55*cl* and the force receiving portion 55*c*2 is a projection disposed on a side surface of the toner frame 55** and projected toward the axial direction LD.

The process cartridge P includes a toner cartridge positioning portion 45 for positioning the toner cartridge T. Further, the apparatus main assembly 100A of the printer 100 includes a toner cartridge pressing portion 110 for holding the toner cartridge T in a predetermined position. The toner cartridge pressing portion 110 is pressed toward a predetermined direction by a spring or the like.

As shown in FIG. 23, when the toner cartridge T is mounted in the apparatus main assembly 100A and the process cartridge P, the portion-to-be-positioned **55*cl* abuts against the toner cartridge positioning portion 45 of the process cartridge P. By this, with respect to the mounting direction TDA, the portion-to-be-positioned 55*cl* of the toner cartridge T is positioned. Further, with respect to a direction perpendicular to the mounting direction TDA and toward downstream of the vertical direction, the portion-to-be-positioned 55*cl* of the toner cartridge T abuts against the toner cartridge positioning portion 45** and is positioned.

Further, the driving-side toner guide 51 is provided with a driving-side rotation stopper **51*a*. The driving-side rotation stopper contacts the apparatus main assembly 100A, so that the toner cartridge T is suppressed from rotating about the portion-to-be-positioned 55*c*1**.

When the toner cartridge T is driven by the apparatus main assembly 100A, the first toner coupling 75 is driven in the counterclockwise direction in part (a) of FIG. 15 and FIG. 23. As a result, a force in the counterclockwise direction acts on the toner cartridge T. When the toner cartridge T is rotated in the counterclockwise direction, the portion-to-be-positioned 55*cl* is separated from the toner cartridge positioning portion 45, so that the position of the toner cartridge T is not determined.

Therefore, the force receiving portion 55*c*2 of the toner cartridge T is pressed by the toner cartridge pressing portion 110 of the apparatus main assembly 100A, so that the portion-to-be-positioned 55*cl* is suppressed from being separated from the toner cartridge positioning portion 45.

With respect to the rotational direction of the first toner coupling 75, the force receiving portion 55*c*2 is disposed on a downstream side of the portion-to-be-positioned 55*c*1. The toner cartridge pressing portion 110 presses the force received portion 55*c*2 in a direction opposite to a rotational direction of the toner cartridge T.

Further, in the constitution of this embodiment, a direction of the force received by the force receiving portion 55*c*2 from the toner cartridge pressing portion 110 is a direction in which movement of the toner cartridge T in the demounting direction TDD is inhibited. In order to reduce a load of a user who performs mounting and demounting of the toner cartridge T, a force generated by the toner cartridge pressing portion 110 may preferably be small. In order to suppress the rotation of the toner cartridge T with a smaller force, a distance between the force receiving portion 55*c*2 and the first toner coupling 75 may preferably be long. In this embodiment, with respect to the direction perpendicular to the axial direction LD, a distance between the rotation center of the first toner coupling 75 and the portion-to-be-positioned 55*cl* and a distance between the rotation center of the first toner coupling 75 and the force receiving portion 55*cl* are almost the same.

The above-described constitution in which the toner cartridge T is pressed toward the process cartridge P is also provided on the non-driving-side of the toner cartridge T. The constitution on the non-driving-side is similar to the above-described constitution on the driving-side, and therefore, description will be omitted.

Next, a positional relationship between the memory tag 90T, the portion-to-be-positioned 55*a*1, and the force receiving portion 55*c*2 will be described.

Incidentally, in this embodiment, the normal direction 90*g* to the surface 90*f*1 on which the electroconductive portion 90*a* of the memory tag 90T is mounted and the mounting and demounting direction TD of the toner cartridge T are directions substantially parallel to each other.

The memory tag 90T is provided on the driving-side of the toner cartridge T, and when the memory tag 90T is mounted in the printer 100, the main assembly contact 92 provided in the apparatus main assembly 100A and the electroconductive portion 90*a* contact each other, so that communication of the memory tag 90T with the controller 107 is established.

At this time, in order to ensure stability of the communication, the main assembly contact 92 contacts the electroconductive portion 90*a* in a state in which the electroconductive portion 90A is pressed along the normal direction 90*g*. When a position of the memory tag 90T is deviated in the state in which the electroconductive portion 90*a* is pressed by the main assembly contact 92, the surface of the electroconductive portion 90*a* is abraded in some cases.

In order to suppress abrasion of the surface of the electroconductive portion 90*a*, the positional deviation of the memory tag 90T may preferably be suppressed. For that reason, in this embodiment, the memory tag 90T was disposed in the neighborhood of the portion-to-be-positioned 55*cl* and the force receiving portion 55*c*2.

Specifically, with respect to the mounting and demounting direction TD of the toner cartridge T, a distance between the memory tag 90T and the portion-to-be-positioned 55*cl* and a distance between the memory tag 90T and the force receiving portion 55*c*2 are shorter than a distance between the memory tag 90T and the first toner coupling 75. Further, the memory tag 90T is disposed so as to at least partially overlap with the force receiving portion 55*c*2 with respect to a direction perpendicular to the axial direction LD and the normal direction 90*g* to the surface 90*f*1.

By the constitution described above, the abrasion of the electroconductive portion 90*a* of the memory tag 90T can be reduced.

Modified Embodiment

Incidentally, the process cartridge P of this embodiment has a constitution in which the electrostatic latent image is developed with the toner supplied from the toner cartridge 1 and in which the toner collected from the photosensitive drum 12 is fed toward the toner cartridge T. However, a constitution relating to protection of the memory tag 90T by the first to fourth projected portions 91*a* and 91*d* and a constitution for supporting the memory tag 90T by the mounting member 91 are also applicable to process cartridges other than the process cartridge P of this embodiment. For example, these constitutions are also applicable to the process cartridge of a type in which the toner is not supplied from a toner cartridge T. In this case, the toner collected from the photosensitive drum 12 is retained in the cleaning collecting chamber 19.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2022-101530 filed on Jun. 24, 2022, 2022-101531 filed on Jun. 24, 2022, 2022-101532 filed on Jun. 24, 2022, and 2022-101533 filed on Jun. 24, 2022, which are hereby incorporated by reference herein in their entirety.

What is claimed is:

1. An image forming apparatus comprising:

an apparatus main assembly;

a first cartridge configured to be detachably mounted to the apparatus main assembly in a first mounting direction, the first cartridge including (i) a developing roller configured to rotate about a first rotation axis extending in a first axial direction, (ii) a developing frame provided with a developing chamber configured to accommodate toner to be supplied to the developing roller, and (iii) a first memory configured to store information and including a first substrate and a first conductive portion, the first substrate including a first surface on which the first conductive portion is disposed, wherein, the first cartridge includes a first end and a second end opposite to the first end with respect to the first axial direction, and the first axial direction crosses the first mounting direction; and a second cartridge configured to be detachably mounted to the apparatus main assembly in a second mounting direction, the second cartridge including (i) a toner feeding member configured to rotate about a second rotation axis extending in a second axial direction, (ii) a toner frame provided with a toner chamber configured to accommodate the toner feeding member and toner to be supplied to the developing chamber, and (iii) a second memory configured to store information and including a second substrate and a second conductive portion, the second substrate including a second surface on which the second conductive portion is disposed, and wherein, the second cartridge includes a third end and a fourth end opposite to the third end with respect to the second axial direction, and the second axial direction crosses the second mounting direction, wherein the second cartridge is detachably mounted to the first cartridge, and wherein, in a state where the first cartridge and the second cartridge are mounted to the apparatus main assembly, (i) the first conductive portion is directed in the first mounting direction, (ii) the second conductive portion is directed in the second mounting direction, (iii) an angle formed by the first mounting direction and a normal direction of the first surface is less than an angle formed by a direction perpendicular to the first mounting direction and the normal direction of the first surface, and (iv) an angle formed by the second mounting direction and a normal direction of the second surface is less than an angle formed by a direction perpendicular to the second mounting direction and the normal direction of the second surface.

2. The image forming apparatus according to claim 1, wherein the apparatus main assembly includes a first main assembly contact and a second main assembly contact, wherein, in the state where the first cartridge and the second cartridge are mounted to the apparatus main assembly, the first conductive portion contacts the first main assembly contact, and the second conductive portion contacts the second main assembly contact.

3. The image forming apparatus according to claim 1, wherein the toner frame includes a discharge opening in communication with the toner chamber, and wherein with respect to the second axial direction, a distance between the second conductive portion and the third end is shorter than a distance between the second conductive portion and the fourth end.

4. The image forming apparatus according to claim 3, wherein with respect to the second axial direction, a distance between the discharge opening and the third end is shorter than a distance between the discharge opening and the fourth end.

5. The image forming apparatus according to claim 4, wherein with respect to the second axial direction, the second conductive portion is provided between the discharge opening and the third end.

6. The image forming apparatus according to claim 3, wherein with respect to the first axial direction, a distance between the second end and the first conductive portion is shorter than a distance between the first end and the first conductive portion, and wherein the first end is closer to the third end than to the fourth end with respect to the first axial direction.

7. The image forming apparatus according to claim 6, wherein the first cartridge includes a development driving member for driving the developing roller, and with respect to the first axial direction, a distance between the development driving member and the first end is shorter than a distance between the development driving member and the second end.

8. The image forming apparatus according to claim 6, wherein the first cartridge includes (i) a developing roller contact electrically connected to the developing roller, wherein with respect to the first axial direction, a distance between the developing roller contact and the second end is shorter than a distance between the developing roller contact and the first end.

9. The image forming apparatus according to claim 8, wherein the developing roller contact is directed in the first axial direction.

10. The image forming apparatus according to claim 6, wherein the first cartridge includes a photosensitive drum.

11. The image forming apparatus according to claim 10, wherein the first cartridge includes a drum driving member for driving the photosensitive drum, and with respect to the first axial direction, a distance between the drum driving member and the first end is shorter than a distance between the drum driving member and the second end.

12. The image forming apparatus according to claim 10, wherein the first cartridge includes (i) a charging member configured to electrically charge the photosensitive drum, and (ii) a charging contact electrically connected to the charging member, wherein with respect to the first axial direction, a distance between the charging contact and the second end is shorter than a distance between the charging contact and the first end.

13. The image forming apparatus according to claim 12, wherein the charging contact is directed in the first axial direction.

14. The image forming apparatus according to claim 1, wherein with respect to the first axial direction, a distance between the second end and the first conductive portion is shorter than a distance between the first end and the first conductive portion.

15. The image forming apparatus according to claim 14, wherein the first cartridge includes a development driving member for driving the developing roller, and with respect to the first axial direction, a distance between the development driving member and the first end is shorter than a distance between the development driving member and the second end.

16. The image forming apparatus according to claim 14, wherein the first cartridge includes (i) a developing roller contact electrically connected to the developing roller, and wherein with respect to the first axial direction, a distance between the developing roller contact and the second end is shorter than a distance between the developing roller contact and the first end.

17. The image forming apparatus according to claim 16, wherein the developing roller contact is directed in the first axial direction.

18. The image forming apparatus according to claim 14, wherein the first cartridge includes a photosensitive drum.

19. The image forming apparatus according to claim 18, wherein the first cartridge includes a drum driving member for driving the photosensitive drum, and with respect to the first axial direction, a distance between the drum driving member and the first end is shorter than a distance between the drum driving member and the second end.

20. The image forming apparatus according to claim 18, wherein the first cartridge includes (i) a charging member configured to electrically charge the photosensitive drum, and (ii) a charging contact electrically connected to the charging member, wherein with respect to the first axial direction, a distance between the charging contact and the second end is shorter than a distance between the charging contact and the first end.

21. The image forming apparatus according to claim 20, wherein the charging contact is directed in the first axial direction.

22. The image forming apparatus according to claim 1, wherein the first cartridge includes a photosensitive drum, a drum frame to which the photosensitive drum is rotatably supported, and wherein the first substrate is mounted on the drum frame.

* * * * *